April 19, 1960 F. G. STEELE 2,933,248
HIGH SPEED DIGITAL CONTROL SYSTEM
Filed April 7, 1955 9 Sheets-Sheet 1

INVENTOR.
FLOYD GEORGE STEELE
BY
Seymour M. Rosenberg
ATTORNEY

April 19, 1960 F. G. STEELE 2,933,248
HIGH SPEED DIGITAL CONTROL SYSTEM
Filed April 7, 1955 9 Sheets-Sheet 2
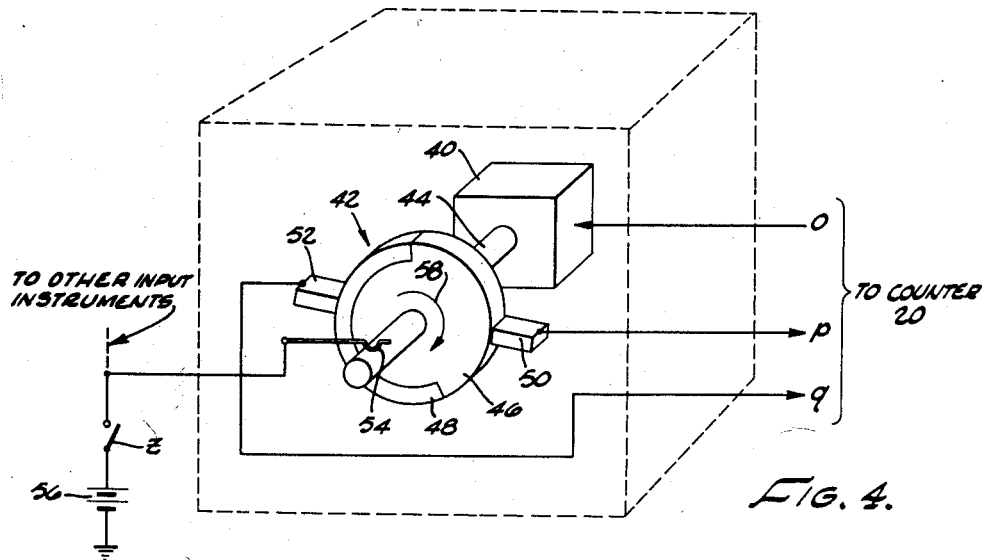
_FIG. 4._
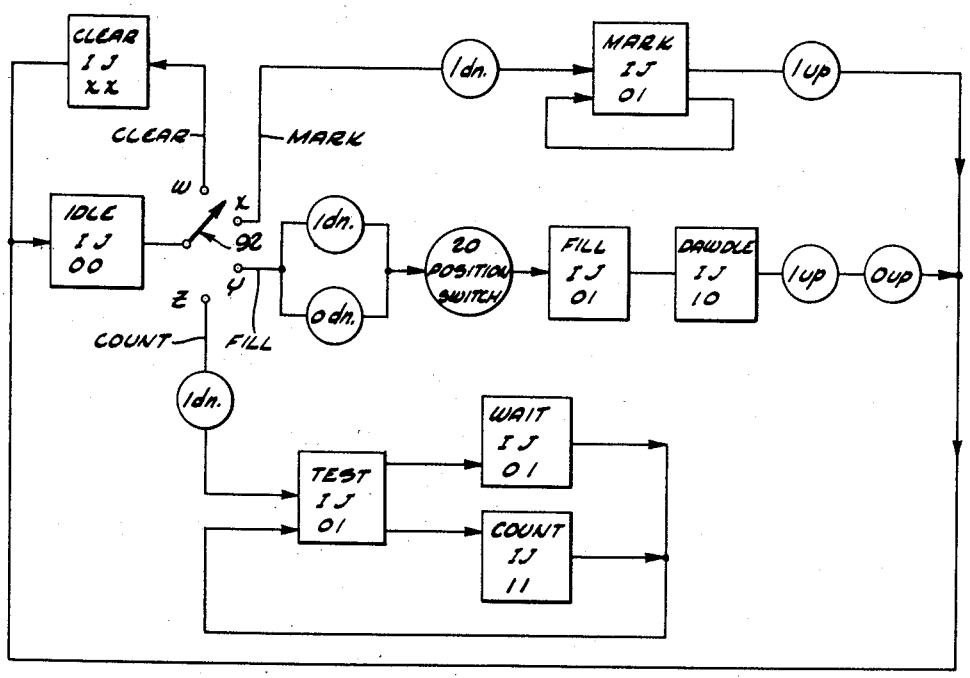
_FIG. 8._
INVENTOR.
FLOYD GEORGE STEELE
BY
Seymour M. Rosenberg
ATTORNEY

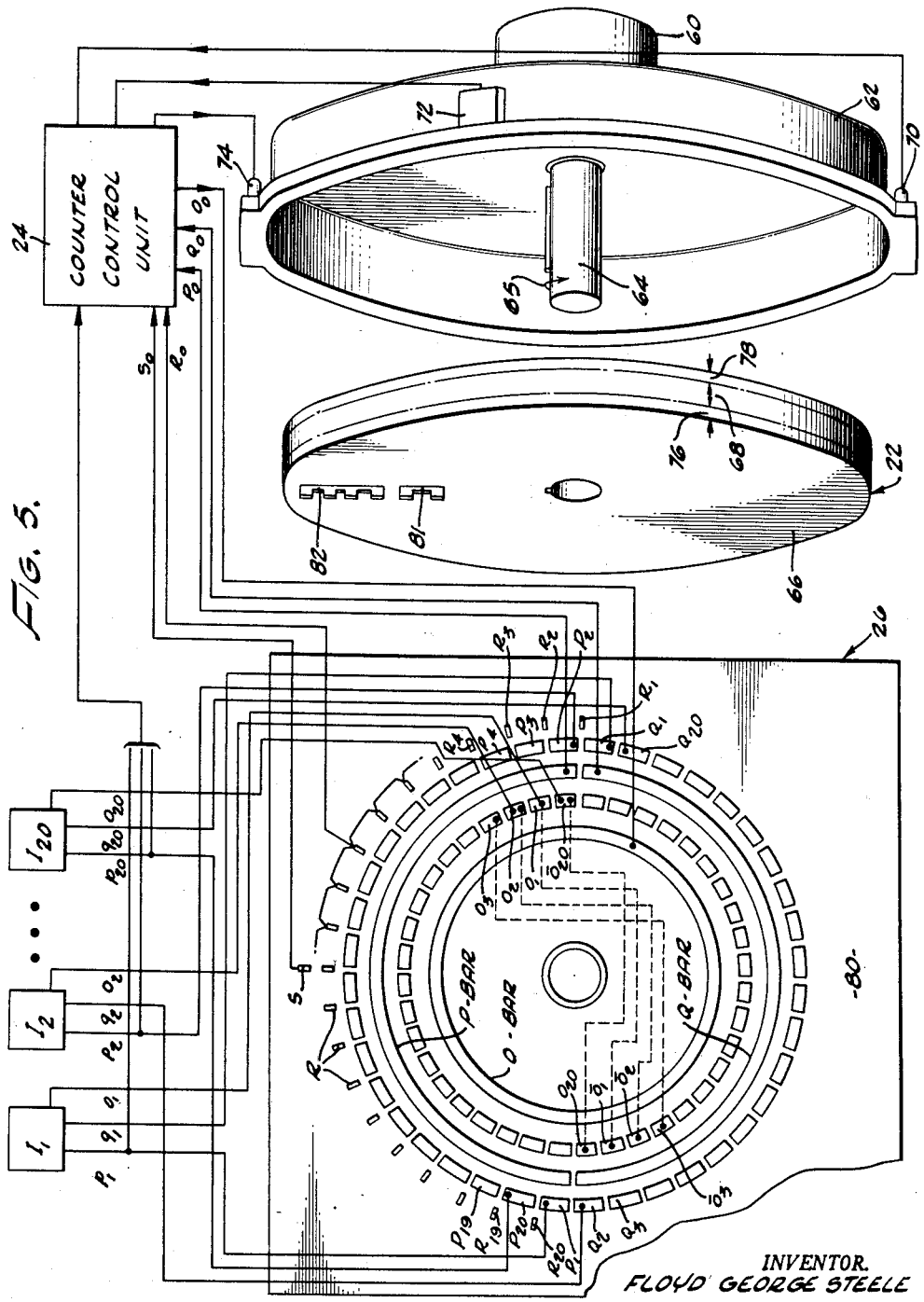

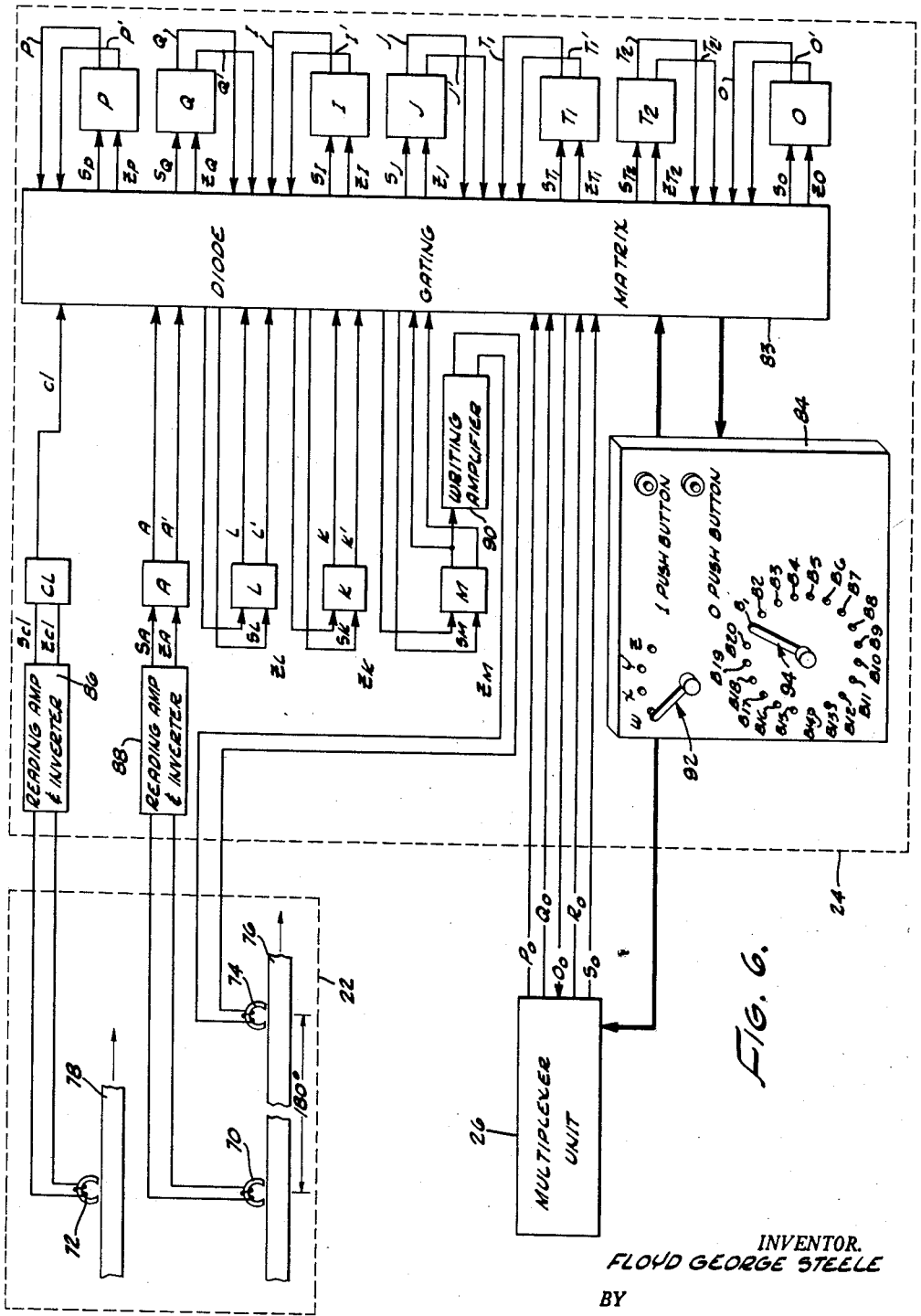

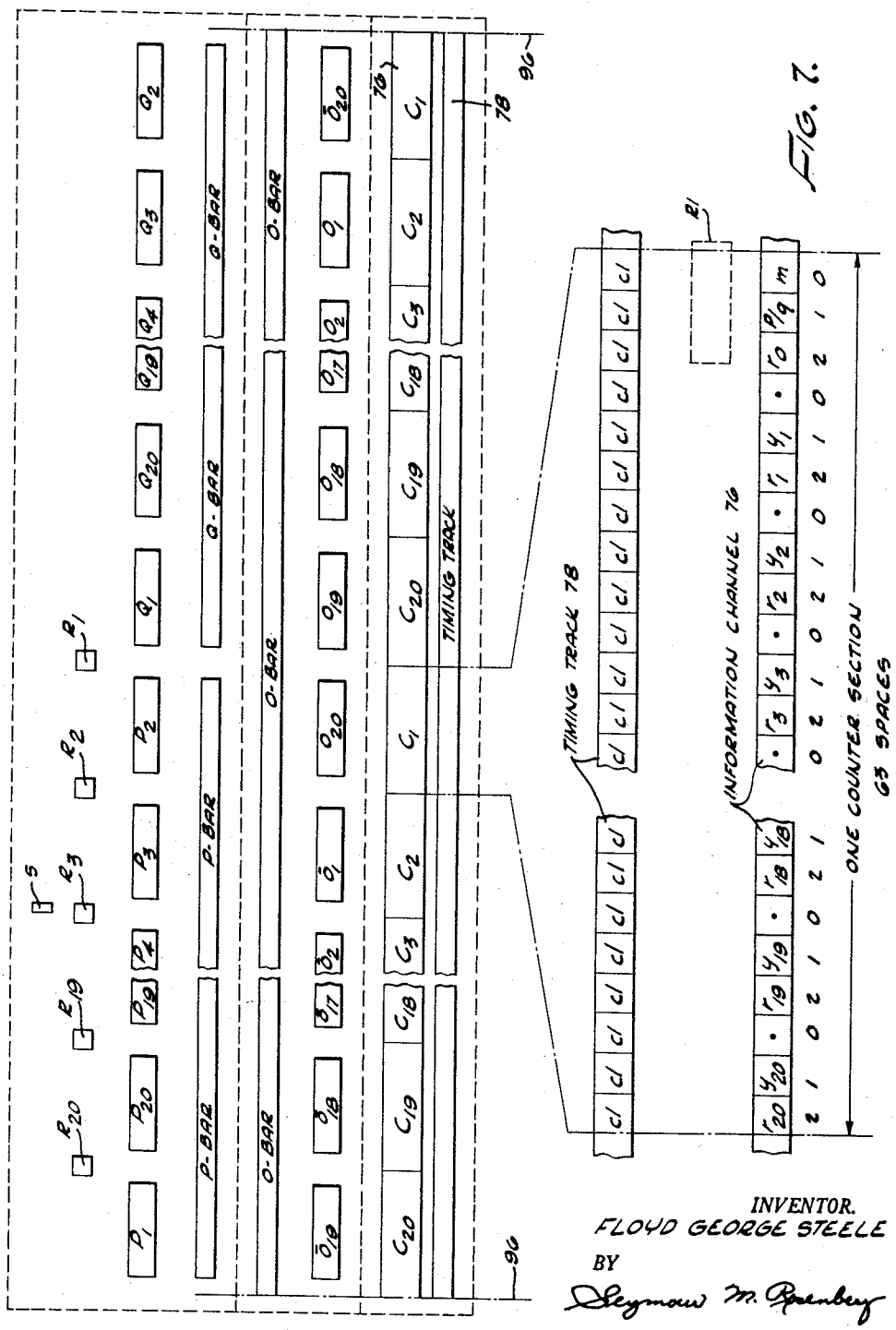

| FIG.10A | FIG.10B | FIG.10C |

INVENTOR.
FLOYD GEORGE STEELE
BY
ATTORNEY

United States Patent Office
2,933,248
Patented Apr. 19, 1960

2,933,248

HIGH SPEED DIGITAL CONTROL SYSTEM

Floyd G. Steele, La Jolla, Calif., assignor to Digital Control Systems, Inc., La Jolla, Calif.

Application April 7, 1955, Serial No. 499,779

20 Claims. (Cl. 235—92)

This invention relates to a high speed digital control system and more particularly to an electronic digital control system wherein a common control network is time-shared by and is utilized for controlling the operation of a plurality of input instruments which produce a corresponding plurality of coded electrical information signals, each information signal indicating each occurrence of a physical phenomenon being monitored by the associated instrument.

Relatively recent advances in the field of automation have emphasized the need for low cost control systems which are capable of controlling physical phenomena with digital accuracy and in which the complex control equipments are time-shared by a relatively large number of measuring instruments. For example, in the field of industrial process control it is often necessary to monitor a large number of measuring instruments and to generate command signals for halting, altering or modifying certain of the physical phenomena when the phenomena have occurred a precise number of times.

According to the present invention there is provided a relatively inexpensive control system which, in its broadest aspect, provides for the independent control of a plurality of input instruments through the utilization of a novel time-shared common control network which periodically samples information signals from the instruments, stores electrical signals indicative of the condition of the instruments, and generates control signals when the condition of the instruments change or when the phenomena being measured by the instruments have achieved predetermined statuses. More particularly there is provided, according to the invention, an electronic digital counter system which is operable in conjunction with a plurality of input instruments for accumulating a corresponding plurality of count signals representative of the number of times the associated instruments have produced output signals indicating the occurrences of physical phenomena being counted or measured by the instruments.

In accordance with the basic concept of the invention each count is accumulated at a rate which is determined by two factors, namely, the rate of occurrence of the phenomenon being counted or measured by the associated input instrument, and by the magnitude of a pre-selected numerical weighting factor by which the accumulated count is incrementally changed each time the phenomenon being measured occurs. The digital counter system of the invention is also operable to generate an output signal each time an accumulated count reaches a predetermined number, the output signal being utilizable for performing any desired control function such as for example, halting, altering or modifying the condition or status of the input instrument which corresponds to the particular count which has reached the predetermined number.

The basic structure of the counter system of the invention comprises a multiplexer unit which is operable to sample the information signals from the input instruments, a recirculating memory unit operating in synchronism with the multiplexer unit for storing signals representative of the accumulated count and for presenting these signals at an output circuit in synchronism with the sampling of the instruments, and a counter control network which is common to all the instruments and which functions to incrementally change the counts when signals are received from the associated instruments indicating that the instruments have changed their condition owing to the occurrence of the phenomena being measured. In addition to the accumulated count signals, the memory unit also stores signals representing the numerical weighting factors by which the accumulated counts are incrementally changed upon receipt of actuating signals from the associated instruments, the numerical weighting factors being entered into the memory unit during the initial programming of the counter system and prior to the commencement of the accumulating operation.

In addition to disclosing the digital counter of the invention as an integrated system, the present invention also discloses several specific features which are applicable to control systems in general and which contribute in and of themselves to the advancement of the general field of automation. Among these features is a multiplexer unit which is operable not only to sequentially sample the information signals from a plurality of instruments in a predetermined sequence, but which is also operative to distribute time delayed output signals generated by an associated control network to the input instruments whose information signals previously initiated the generation of the output signals.

Still another novel feature of the invention is the combination of elements provided for determining, in a non-ambiguous manner, when the condition of an input instrument has changed from the condition of the instrument when the information signals therefrom were previously sampled. More specifically the memory unit is employed for storing a plurality of instrument condition signals indicative of the condition of the instruments after the information signals from the instruments last indicated the occurrence of the phenomena being counted or measured. Each time an information signal is sampled thereafter it is compared with the corresponding instrument condition signal to determine whether the condition of the instrument has changed since the information signal was last sampled; when a change in the condition of the instrument is thereby detected a control signal is generated for modifying the electrical signal representing the accumulated count of the instrument, and in addition, to store in the memory unit a new instrument condition signal representative of the new condition of the instrument.

It is, therefore, an object of the invention to provide an electronic digital control system which utilizes a time-shared common control network for individually controlling the operation of a plurality of associated input instruments.

Another object of the invention is to provide an electronic digital counter operable in conjunction with a plurality of instruments for accumulating a corresponding plurality of counts, each count representing the number of times a coded electrical information signal from the associated input instrument has indicated the occurrence of a physical phenomenon being counted or measured by the instrument.

A further object of the invention is to provide an electronic digital counter wherein a common time-shared control network is utilized to periodically sample a plurality of electrical information signals generated by a corresponding plurality of instruments, to store electrical signals indicative of the number of occurrences of the phenomena being measured by the instruments, and to generate an output signal each time the phenomenon being measured by an instrument has occurred a predetermined number of times.

Still another object of the invention is to provide a common control network for an electronic control system, the control network being operable for generating a control function each time the operational condition of an associated input instrument is changed.

A still further object of the invention is to provide an electronic digital counter wherein a common time-shared control network is utilized to periodically sample a plurality of information signals representative of the condition of a corresponding plurality of input instruments, to store electrical signals indicative of the condition of the instruments, and to generate a control signal each time the condition of an instrument, as indicated by its associated information signal, has changed.

An additional object of the invention is to provide a multiplexer unit utilizable in conjunction with a common control network for controlling the operation of a plurality of input instruments, the multiplexer unit being operable for sequentially sampling information signals from the instruments to apply to the common control network an input signal train and being operable to distribute delayed output signals from the control network to the input instruments whose information signals were responsible for the generation of the output signals.

It is also an object of the invention to provide a novel input gating network for producing electrical output signals whenever a plurality of input conditions, expressible by the closure of at least one electrical switch and the receipt of predetermined signals from a plurality of input signal sources, are satisfied.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Fig. 4 is a schematic diagram of one form of input instrument which may be utilized with the counter system of the invention;

Fig. 5 is a schematic view of one form of multiplexer unit which may be utilized in the counter system of Fig. 1 and illustrates one manner in which the multiplexer unit may be synchronized with the memory unit;

Fig. 6 is a block diagram of the counter control unit shown in Fig. 1;

Fig. 7 is a diagrammatic view correlating the relative positions of the various commutator segments of the specific multiplexer unit shown in Fig. 5 with the presentation of electrical information signals at the output circuit of the memory unit;

Fig. 8 is a flow diagram illustrating the operational sequence of the counter system of the invention;

Figure 1:
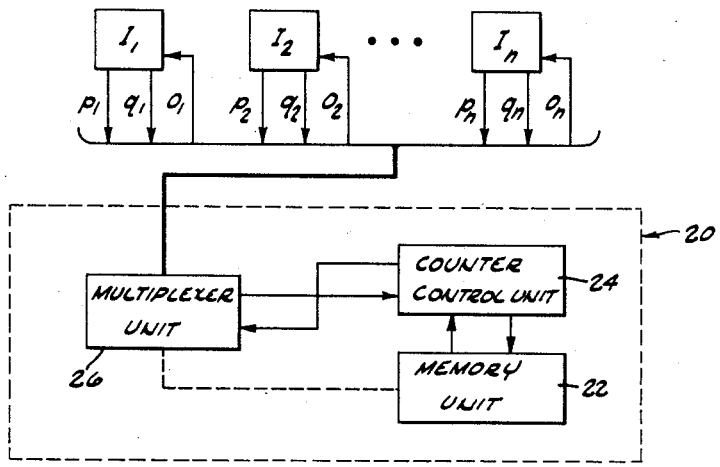
Fig. 1 is a block diagram of the counter system of the invention illustrating how it may be utilized for controlling the operation of a plurality of input instruments.

Referring now to the drawings, wherein like or corresponding parts are designated by corresponding reference characters throughout the several views, there is shown in Fig. 1 a counter, generally designated 20, which is operable in conjunction with a plurality of input instruments $I_1, I_2, \ldots I_n$ for independently counting the sequential operations represented by electrical output signals from the instruments. Counter 20, according to the invention, includes three basic components, namely; a memory unit 22 for storing signals corresponding to the total count produced by each of the input instruments, a counter control unit 24 for selectively modifying the counts stored in memory unit 22, and an input multiplexer 26 operable in synchronism with memory unit 22 for sequentially sampling each of the signals from the input instruments and applying these signals to counter control unit 24.

As shown in Fig. 1 each of the input instruments produces a pair of input signals, hereinafter designated signals $p$ and $q$, which are applied to multiplexer 26 over a pair of associated conductors. In addition, each instrument is also connected to multiplexer 26 by a third conductor which is utilized for applying to the instrument a counter output signal hereinafter designated signal $O$, the input and output signals to a particular instrument being denoted by a numerical subscript corresponding to the numerical designation of the input instrument.

Broadly, the basic functions which may be performed by the combination of the counting system and its associated input instrument may be best understood by reference to the following examples. Assume that instrument $I_1$ comprises a sensing mechanism placed adjacent a production line for counting the items produced as they proceed down the line. Each pair of consecutive items thus counted appears as alternate $p_1$ and $q_1$ signals on the associated input conductors, these signals being received by counter 20 and, in a manner to be hereinafter described, counted. The counting operation continues until a predetermined count is reached, at which time counter 20 produces an output signal $O_1$ on the associated output conductor. This output signal may be utilized in a variety of ways within instrument $I_1$ to either stop the production line itself, initiate production of another item thereon, initiate movement of another production line, or to merely indicate the total number of items fabricated.

As another example, instrument $I_2$ might include a rotating shaft whose rotations serve to measure a length of sheet metal or cloth, each rotation of the shaft generating alternate $p_2$ and $q_2$ signals. Consequently, the appearance of an output signal $O_2$ on the associated output conductor could be utilized to signify the measurement of a given length of the material and act to stop any further movement thereof by stopping the mechanism driving the material past the shaft. It will be recognized, of course, that the examples set forth hereinabove are not intended to be exhaustive but are merely provided to illustrate possible counter uses, and that other uses of the counter of the invention will be readily evident to those skilled in the art.

It should also be pointed out that the input instruments might differ from each other and need not be identical in form. The only similarity required is that each instrument be capable of generating alternate $p$ and $q$ output signals representing a function to be counted.

As previously described, counter 20 is independently responsive to each pair of $p$ and $q$ input signals to produce a corresponding output signal whenever a predetermined count is reached, the magnitude of the count at which an output signal is produced being controlled by initial conditions set up in the counting system. Accordingly, by utilizing different initial conditions for each of the functons being counted, the counter will apply a O output signal to a particular instrument only when a count is accumulated which corresponds to the desired numerical count for that particular instrument. Thus, counter 20 basically comprises an integral apparatus capable of independently counting signals from a plurality of different sources and capable of producing a separate control signal for each source signifying the source to have attained a predetermined count. Accordingly, the counter may be positioned centrally in a manufacturing establishment and serve to control the operation of a plurality of different types and kinds of apparatus or machines, each machine so controlled requiring only three electrical connections to the counter.

Figure 2:
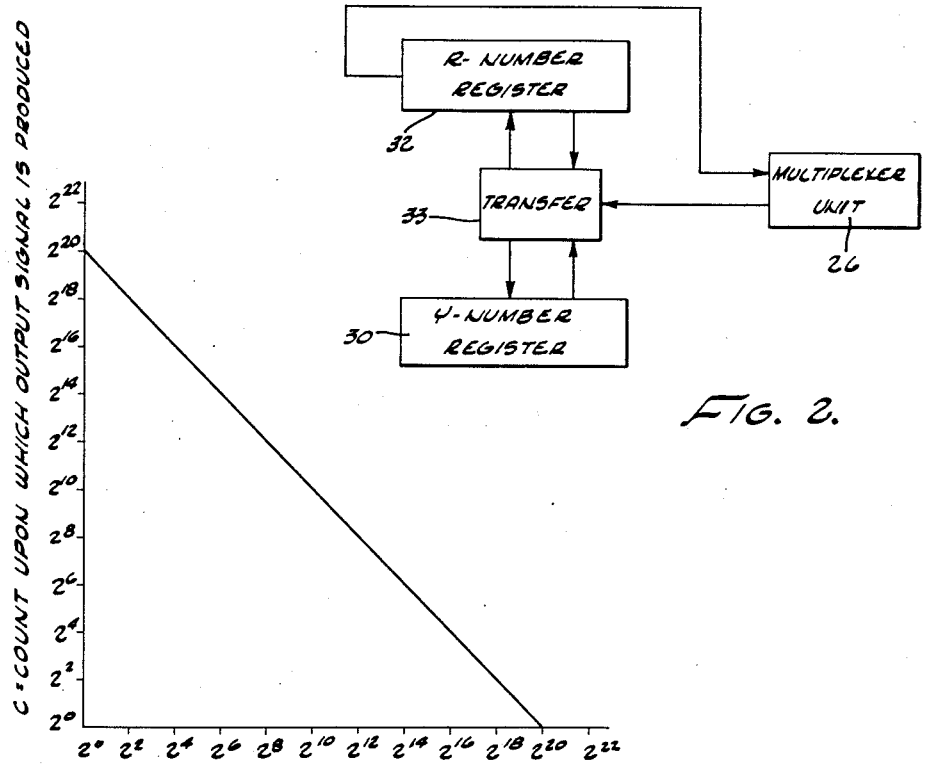
Fig. 2 is a block diagram of a single counter illustrating the manner in which the counter system of the invention functions to count in response to input signals.

In order to facilitate the description of the counter of the invention, it will be assumed hereinafter that the system includes twenty counter sections which are operable in conjunction with twenty respectively associated input instruments. With reference now to Fig. 2, there is illustrated a functional block diagram which indicates the principal constituents of each counter section and the basic manner in which they cooperate. As shown in Fig. 2, each counter section includes a Y-number register 30 and an R-number register 32 which are intercoupled through a transfer network 33. As will be set forth in detail hereinbelow, the Y-number and the R-number of each counter section are recorded in an interplexed fashion on a single channel or track of a magnetic memory wheel or drum aand are thereafter recirculated, transfer network 33 being common to all counter sections and being operable in response to signals received from the association input instruments for transforming the numbers in the R-registers in accordance with the magnitudes of the numbers in the corresponding Y-registers.

More particularly, each input signal from a particular input instrument is applied through multiplexer unit 26 to transfer network 33 and is operative to order the Y-number stored in the corresponding counter section to be additively transferred into the R-number register, the Y-number remaining unchanged in the process. The additive process is repeated with each input signal applied from the particular input instrument until the R-number register overflows, at which time an output signal is produced by the R-number register signifying that the desired count has been achieved. It will be recognized by those skilled in the art that the term "overflow" signifies that the number in the R-register has exceeded the capacity of the register with the result that a carry digit represented by an output signal is produced on the associated output conductor. The overflow signal from a particular counter section corresponds to the O output signal described in connection with Fig. 1, and is applied through multiplexer unit 26 to the corresponding input instrument to indicate the attainment of a predetermined count.

In order to correlate the component elements of the counter section shown in Fig. 2 with the circuit components shown in Fig. 1, it should be pointed out that in practice the Y-number and the R-number registers of Fig. 2 are actually recirculating section of memory unit 22 of Fig. 1, while transfer network 33 of Fig. 2 constitutes a portion of counter control unit 24 of Fig. 1. It is also worth noting that although Fig. 2 illustrates the R-number overflow output signal as being generated by register 32, in the invention as actually practiced the output signal is generated within transfer network 33 while the Y and R numbers are being recirculated therethrough.

It will be recognized from the foregoing description of Fig. 2 that the count upon which an overflow or output signal is produced depends upon the magnitude of the Y number in the Y register. For example, if the R register and Y register each have a capacity of $n$ binary bits or digits, and the number stored in the Y register has a binary value of one only in its least significant digit, then $2^n$ count signals must be received before the R register will overflow to produce an output signal. If, on the other hand, the most significant digit of the Y number has a binary value of one, the R register will overflow and produce an output signal when only two count signals have been received.

It may be shown that the relationship between the number of count signals required to produce an output signal is related to the number of digits storable in the R register and to the magnitude of the number initially stored in the Y register in accordance with the following equation:

$$\text{Log}_2 Y = n - \text{log}_2 C \qquad (1)$$

where:
$Y$ = the decimal equivalent of the binary number stored in the Y register;
$n$ = the number of binary bits which may be stored in the R register; and
$C$ = number of count signals required to produce an R register overflow signal.

Figure 3:
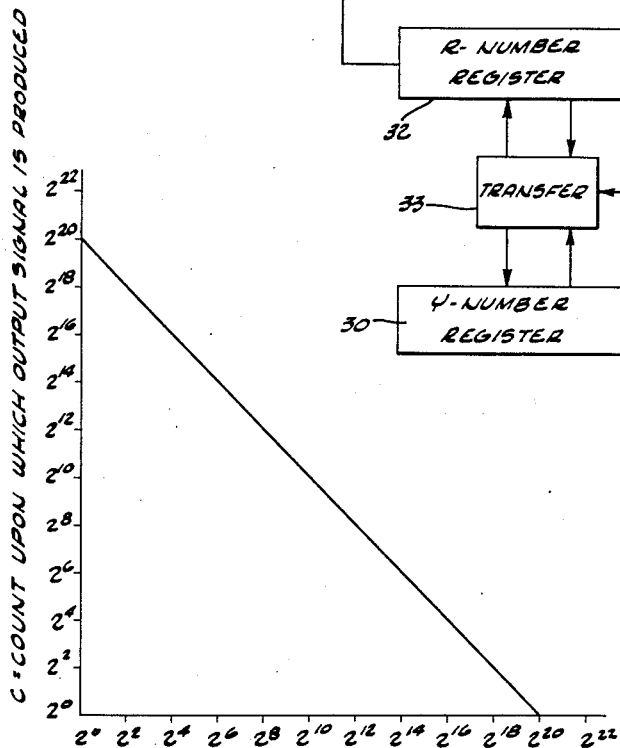
Fig. 3 is a graph which illustrates the manner in which the counter system of the invention may be utilized to accumulate a plurality of counts at different rates.

With reference now to Fig. 3 there is illustrated a plot of Equation 1 on a log-log scale for a counter section whose R register has a capacity of 20 binary bits, the decimal equivalent of the Y number being plotted as the abscissa while the number of count signals required to produce an output signal are plotted as the ordinate. Through the utilization of a graph such as that shown in Fig. 3, each counter section in the counter of the invention may be controlled so as to produce an output signal on a predetermined count by selecting the proper Y number to be initially stored in the Y register. For example, to produce an output signal after $2^{16}$ or 65,536 count signals, one need only set into the Y register the number $2^4$ or 16. Thereafter, each count signal functions to add 16 to the number in the R register until the register overflows and produces an output signal on the desired count.

In order to implement the subsequent detailed description of the counter of the invention and to indicate the manner in which the input signals applied thereto are counted, a typical input instrument which may be utilized with the counter will first be described. Referring now to Fig. 4, there is shown an input instrument which includes an actuator mechanism 40 and an angular quantizer, generally designated 42, which is connected to actuator 40 by a shaft 44.

Actuator mechanism 40 may be any of numerous mechanical or electromechanical devices which function to rotate an associated shaft at a rate proportional to the rate of occurrence of a physical phenomenon which is to be counted or measured. For example, the actuator mechanism might include a gear train for rotating shaft 44 at a rate proportional to the speed to which items on an associated assembly line are processed or fabricated. In addition, the actuator mechanism may include a suitable clutch or indicating mechanism which is responsive to an output signal O from the counter of the invention for stopping, altering or indicating the status of the physical phenomena being counted or measured.

In the particular instrument embodied in Fig. 4, quantizer 42 includes a disk 46 of conductive material mounted on shaft 44, an arcuate peripheral section 48 of the disk being composed of inlaid insulative material. In addition, quantizer 42 includes a pair of diametrically opposed brushes 50 and 52 which contact the periphery of disk 46, and an input brush 54 which is interconnected to a source 56 of positive potential through a switch Z. In operation the $p$ and $q$ output signals from the instrument are taken from brushes 50 and 52, respectively, the Z switch being employed as described hereinafter to energize the input instrument only when the counter of the invention is performing its count operation.

Insulative section 48 of disk 46 subtends an arc just long enough to prevent brushes 50 and 52 from ever simultaneously contacting the conductive portion of the disk. Thus, if brushes 50 and 52 are displaced relative to each other by exactly 180°, and each brush subtends an arc of 5°, for example, it will be recognized that insulative section 48 must subtend an arc at least slightly larger than 185°.

Consider now the operation of quantizer 42 as its $p$ and $q$ output signals are sampled and counted by the counter of the invention. If it is assumed that shaft 44 can only rotate in the direction of arrow 58 and that shaft rotation starts with insulative section 48 in the position shown in Fig. 4, it will be recognized that initially a $p$ signal is generated while no $q$ signal is generated. As shaft rotation continues both brush 50 and brush 52 will eventually both engage insulative section 48 simultaneously, thereby opening both the $p$ and $q$ signal conductors. Thereafter continued rotation of the shaft will interconnect source 56 with the $q$ signal conductor and thereby generate a $q$ signal. It is clear, therefore, that the instrument is capable of generating either a $p$ signal alone or a $q$ signal alone but never both together.

As will be explained in more detail hereinafter the counter of the invention stores in its memory unit an information bit indicating whether the last count occurred from a $p$ signal or a $q$ signal, and counts only when the signal being received from the input instrument is different from the signal which produced the last count. Accordingly, if it is assumed that the last count occurred from a $q$ signal and the input instrument shaft thereafter rotates to the position shown in Fig. 4 and then stops, the counter of the invention will count the first time it samples the $p$ signal but will not count thereafter until the shaft is rotated sufficiently to produce a $q$ signal.

From the foregoing descripiton it will be recognized that the counter of the invention must sample the $p$ and $q$ input signals from each input instrument at least once during the time required for an instrument brush to traverse the conducting periphery of disk 46 when the disk is rotating at maximum speed. If it is assumed, therefore, that the conducting portion of disk 46 subtends an arc of 170°, the relationship between the angular speed of the shaft and the sampling frequency of the counter may be expressed by the equation:

$$\omega = f\pi \times \frac{170}{360} \quad (2)$$

where:

$\omega$ = the maximum angular velocity of shaft 44 in radians per second; and
$f$ = the frequency at which each input instrument is sampled.

With reference now to Fig. 5, there is illustrated in detail one form of mechanical structure which the combination of multiplexing unit 26 and memory unit 22 may take to provide synchronous operation between the two units. As shown in Fig. 5, the structure includes an electric motor 60 which is centrally mounted at the end of housing member 62 and which, when energized, drives a keyed shaft 64 at a substantially constant speed in the direction of arrow 65. Housing member 62 may be constructed of any suitable material but is preferably constructed of the same material which is utilized in fabricating the memory unit described hereinbelow.

In the embodiment shown in Fig. 5 memory unit 22 includes a memory drum or disk 66 which is adapted to be positioned within housing member 62 and to be keyed to shaft 64 to rotate therewith. Drum 66 may be constructed of any suitable material, such as plastic or aluminum, and has a thin coating 68 of magnetic material, such as iron oxide or nickel-cobalt, extending around its periphery. In addition, the memory unit also includes a pair of magnetic reading heads or transducers 70 and 72, respectively, and a magnetic writing head or transducer 74, these transducers being mounted on housing member 62 and positioned so as to be adjacent the magnetic periphery of drum 66 when the drum is positioned within the housing member. As indicated by the electrical connections to the transducers, reading heads 70 and 72 are operable to transmit intelligence information from drum 66 to counter control unit 24, while writing head 74 is operable for recording on the drum intelligence information received from the counter control unit.

The reading and writing transducers may be constructed in accordance with any of several techniques known to the art, and may for example, take the form of the transducer disclosed in copending U.S. patent application Serial No. 370,393 for "Transducer Head," filed July 27, 1953, and now abandoned, by Donald B. Nelson and William F. Nugent. Transducers 70 and 74 are mounted on housing member 62 so as to magnetically read and write, respectively, on the same information channel on memory drum 66, this information channel being designated 76 in Fig. 5. In operation channel 76 and its associated writing and reading transducers are utilized as a recirculating register, intelligence information recorded by transducer 74 being read a finite time later by transducer 70 and being fed back into counter control unit 24 where it is either selectively modified or left unchanged, depending upon whether a count operation is being performed, and then rewritten on channel 76 by transducer 74.

Reading transducer 72, on the other hand, is positioned to read intelligence information from a permanently recorded timing track 78 on drum 66. As will be set forth in more detail hereinafter, the magnetization of track 78 is such as to produce a sine wave output signal from transducer 72, this signal being amplified within counter control unit and thereafter being utilized to control an associated timing flip-flop or bistable multivibrator, the output signal from the timing flip-flop being employed in turn as a timing or clock pulse for synchronizing all gating and triggering operations within the counter control unit.

In the particular structural embodiment shown in Fig. 5, multiplexer unit 26 includes an insulating plate 80 having a plurality of concentric commutator bands or sections mounted thereon, and a centrally positioned bushing suitably dimensioned to receive the end of shaft 64. Progressing from the center of plate 80 radially outward, the first commutator band is designated the O-bar and extends in a continuous conductive band about the center of the plate and is connected to counter control unit 24 over a conductor $O_0$ for receiving output signals from the counter.

The next commutator band is adapted to cooperate with the O-bar for distributing output signals from the counter control unit to the various input instruments, and is composed of 40 segments which are termed output segments, their designations being from $O_1$ to $O_{20}$ and $\bar{O}_1$ to $\bar{O}_{20}$ in a counter clockwise direction. It will be noted that the O segments and $\bar{O}$ segments designated by the same numerical subscript are electrically interconnected, as indicated by the dotted lines interconnecting segments $\bar{O}_1$, $\bar{O}_2$, $\bar{O}_{19}$ and $\bar{O}_{20}$ with segments $O_1$, $O_2$, $O_{19}$ and $O_{20}$, respectively. In addition, each pair of $O$ and $\bar{O}$ segments bearing the same numerical subscript are interconnected to the O-signal conductor of the input instrument designated by the same numerical subscript. Thus, segments $O_1$ and $\bar{O}_1$ are both connected to input instrument $I_1$. In operation the O-bar is sequentially connected to each of the $O$ and $\bar{O}$ segments through a brush or shorting member 81 mounted on the side of memory drum 66, thereby automatically synchronizing with the drum rotation the interconnections between the first two commutator bands.

Continuing radially outward, the third commutator band includes two semicircular commutator sections which are designated the P-bar and Q-bar, respectively, these two commutator sections being electrically connected to counter control unit 24 over conductors $P_0$ and $Q_0$, respectively. As will be more clearly understood from the description of Fig. 7 hereinbelow, the P-bar and Q-bar cooperate with each of the remaining commutator bands still to be described through a multiple brush unit 82 mounted on the side of memory drum 66.

The next commutator band on plate 80 is similar to the second commutator band in that it is also composed of 40 segments, the 20 segments located adjacent the P-bar being designated $P_2, P_3, \ldots P_{19}, P_{20}, P_1$ in a counter clockwise direction and being connected to the p-signal conductors of the correspondingly designated input instruments. The 20 segments located adjacent the Q-bar, on the other hand, are designated $Q_2, Q_3, \ldots Q_{19}, Q_{20}, Q_1$, respectively, in a counter clockwise direction and are connected to the q-signal conductors of the correspondingly designated input instruments. It will be noted that rotation of memory drum 66 functions through the medium of brush 82, to sequentially interconnect the P-bar with each of the P segments, and then to sequentially interconnect the Q-bar with each of the Q segments. The reason for "slipping" the numbering of the P and Q segments relative to the designation of the O segments lying along the same radii will be described more fully below in the description of Fig. 7. It will also be noted from Fig. 5 that each of the p-signal conductors from the input instruments is connected to counter control unit 24. These connections are provided to permit initial Y-numbers to be set into the various counter registers which, as will be recalled from the description of Fig. 2, consist of a portion of the memory unit.

The next succeeding commutator band, as shown in Fig. 5, is semicircular in form and is composed of 20 segments, designated $R_1$ through $R_{20}$, the R segments being associated with the twenty P segments, respectively. It will be noted that each R segment is of relatively small width in comparison with the width of the P segments, all of the R segments being connected together and to counter control unit 24 over a conductor $R_0$. As will be set forth in more detail below, the R segments are utilized for marking the position of the various counter registers which are to be recorded on drum 66. Each R segment is connected to the P-bar through brush 82 at a time immediately prior to the interconnection of the P-bar to the next succeeding P segment. In other words, the $R_1$ segment, for example, is connected to the P-bar just prior to the connection of the P-bar to segment $P_2$.

The outermost commutator band in the embodiment shown in Fig. 5 includes only a single commutator section which is designated the S segment. The segment is also interconnected with counter control unit 24 over a conductor $S_0$, and in addition, is connected with the P-bar through brush 82 once during each revolution of memory drum 66. The function of the S segment, as will be indicated in more detail hereinafter, is to set the timing of counter control unit 24 to coordinate its various functions.

One process which may be utilized for constructing the above-described multiplixer unit is to utilize conventional printed circuit techniques. It is to be expressly understood, however, that other techniques may be employed, and that the multiplexer unit used with the counter of the invention should not be restricted to the particular form of commutator illustrated in Fig. 5. For example, inductive pick-ups, beam switching devices, ring counters or other forms of electronic multiplexers could be utilized, if desired, for communicating between the input instruments and counter control unit 24.

Referring now to Fig. 6, the principal components of counter control unit 24 are illustrated in block schematic form, together with the cooperating portions of memory unit 22 and multiplexer unit 26. As shown in Fig. 6, the counter control unit includes a diode gating matrix 83, a plurality of switches on a panel 84 operable in conjunction with matrix 83 for controlling the various operations and subroutines of the counting operation, and a plurality of flip-flops or bistable multivibrators which are operable in conjunction with matrix 83 and memory unit 22 for performing the various operations and subroutines of the counter.

It will be recalled from the description of Fig. 5 that reading transducer 72 and its associated timing track were operable in conjunction with an associated circuit in the counter control unit for producing a periodically occurring clock or timing signal. It will also be recalled that the magnetization of the timing track 78 was such as to produce a sinusoidal output signal from transducer 72. As shown in Fig. 6, the output signal from transducer 72 within memory unit 22 is applied to a reading amplifier and inverter circuit 86 within the counter control unit, the output signals from circuit 86 being applied to the $S_{cl}$ and $Z_{cl}$ input terminals of a clock pulse flip-flop CL. In operation flip-flop CL is triggered to first one and then the other of its bistable states once during each cycle of the timing signal presented by transducer 72. More particularly, each change in the direction of magnetization of timing track 78 functions to produce signals which reverse the conduction state of flip-flop CL in the manner well known to the art with the result that the flip-flop produces an output signal consisting of alternately high and low level voltages. Accordingly, if the period of each cycle of each timing signal from transducer 72 is termed one digit time interval, it is clear that the output signal $cl$ taken from one conduction section of flip-flop CL will be raised to its high level value once during each digit time interval, thereby providing a clock signal for actuating the associated counter circuits once per digit time interval.

Before continuing further with the description of the counter control circuit, consideration will be given to the designation of the input and output conductors of the various flip-flops to be described hereinafter. Each flip-flop includes a pair of input conductors which are designated the S input conductor and the Z input conductor, respectively, each conductor being further designated by an alphabetical subscript corresponding to the alphabetical designation of the corresponding flip-flop. In addition, each flip-flop includes a pair of output conductors one of which is designated by the same alphabetical designation as the flip-flop from which it is taken, while the other is designated by the prime of the alphabetical designation of the electrical flip-flop. Thus, for example, flip-flop I has both $S_I$ and $Z_I$ input conductors and I and I' output conductors.

In operation each flip-flop wil be assumed to be responsive to the application of an input signal to its S input conductor for setting to a conduction state corresponding to the binary value one, and to the application of an inut signal to its Z input conductor for setting to the opposite conduction state, which corresponds to the binary value zero. In addition, it will be assumed that when the flip-flop is in its 1-representing state the voltage presented on its correspondingly represented output conductor has a relatively high level value while the voltage presented on its prime output conductor has a relatively low level value. Conversely, when the flip-flop is in its 0-representing state the voltage presented on its correspondingly designated output conductor has a relatively low level value whereas the voltage presented on its prime output conductor has a relatively high level value. For example, when flip-flop I is in its 1-representing state, high and low level signals are presented on output conductors I and I', respectvely, whereas these voltage levels will reverse when flip-flop I is in its 0-representing state.

Returning again to the description of Fig. 6, reading transducer 70 within memory unit 22 is also electrically coupled to a flip-flop A through an associated reading amplifier and inverter circuit 88, flip-flop A and circuit 88 being operable in conjunction with reading transducer 70 for presenting on the output conductors from flip-flop A a pair of complementary two level output signals corresponding to the binary information represented by the magnetization of that portion of information channel 76 which is passing beneath the reading transducer. More particularly, the conduction state of flip-flop A is reversed with each change in the direction of magnetization of channel 76 immediately beneath transducer 70; accordingly, the sequential conduction states of flip-flop A correspond to the binary values of the sequential binary digits represented by the magnetization of sequential areas on track 76 as they pass the reading transducer.

The electrical output signals A and A' from flip-flop A are applied to diode gating matrix 83 wherein they are combined with the clock pulse signals $c1$ and thereafter applied to the $S_L$ and $Z_L$ input conductors, respectively, of an associated flip-flop L. It is clear, therefore, that the complementary output signals L and L' from flip-flop L also represent the binary information recorded on information channel 76, but are synchronized in time with the clock signal CL. It will be recognized by those skilled in the art that flip-flop A thus serves as a buffer for temporarily storing intelligence information read from track 76 until it can be synchronously stored in flip-flop L. In practice it has been found that the output signals from reading amplifier and inverter 88 may be clocked directly into flip-flop L and consequently eliminate flip-flop A provided that the rotational speed of the memory drum and the operation of the reading and writing circuits are accurately controlled to prevent time modulation of the signals recorded on the information channel.

Associated with flip-flop L in counter control unit 24 are two additional flip-flops designated K and M, respectively, the input and output conductors of these flip-flops being connected to gating matrix 83. In addition, one of the output conductors from flip-flop M is connected to a writing amplifier 90 which, in turn, is connected to writing transducer 74 adjacent information channel 76 for recording in memory unit 22 intelligence information represented by the successive conduction states of flip-flop M. The intelligence information recorded by transducer 74 consists of a series of binary digits, each digit thus recorded being represented by a magnetic cell whose direction of magnetization corresponds to the binary value of the digit, each cell occupying what will hereinafter be referred to as one space on information channel 76. It will be recognized that each of the spaces corresponds in length to the arcuate distances traveled by channel 76 relative to transducers 70 and 74 during one digit time interval as represented by the period of the clock pulse signal $c1$.

As will be described in more detail herein below, the sequential binary digits presented at the output circuit of flip-flop L may be operated upon in a number of different manners depending upon the operation being performed and the particular subroutine being carried out within the operation. For example, an individual binary digit represented by the signals appearing at the output circuit of flipflop L may at times be shifted directly into flip-flop M to be re-recorded on track 76, may be shifted through flip-flop K and then into flip-flop M to be re-recorded on track 76, or may be selectively modified in accordance with the values of the binary digits instantaneously stored in flip-flops K and M in order to re-write in channel 76 during the succeeding digit time interval a binary digit of the opposite value.

Referring once more to Fig. 6 the counter control circuit also includes a pair of count flip-flops P and Q, an output flip-flop O, a pair of timing flip-flops $T_1$ and $T_2$, and a pair of programming flip-flops I and J, the input and output conductors from all of these flip-flops being connected to gating matrix 83. In operation flip-flops P and Q are respectively utilized in conjunction with P-bar and Q-bar of multiplexer unit 26 for storing input signals from the input instruments, while flip-flop O is utilized in conjunction with the O-bar in the multiplexer unit for temporarily storing output signals to be applied to the input instruments when they have arrived at their predetermined count.

Flip-flops $T_1$ and $T_2$, on the other hand, are in general employed to identify the presentation of predetermined information bits at the output circuits of flip-flops L and M. More particularly, $T_1$ and $T_2$ are interconnected as a two-stage scale of three flip-flop counter which is utilized for counting the timing intervals represented by the clock pulse signal $c1$. Programming flip-flops I and J, in turn, are employed for controlling the particular subroutines which are carried out within each operation performed by the counter of the invention. More particularly, programming flip-flops I and J are employed in conjunction with an operation switch in switch panel 84 for controlling the functions of the counter of the invention within each operation called for by the placement of the operation switch.

As shown in Fig. 6, switch panel 84 includes an operation switch, generally designated 92, a counter fill switch, generally designated 94 and a pair of pushbuttons designated the 1 and 0 pushbuttons, respectively. Operation switch 92 and counter fill switch 94 each includes a movable switch arm adapted to selectively engage a plurality of fixed switch points, the switch arm of switch 92 being engageable with four switch points designated W, X, Y and Z corresponding to the counter operations set forth in the following table.

| Operation switch position: | Counter operation |
| --- | --- |
| W | Clear. |
| X | Mark. |
| Y | Fill. |
| Z | Count. |

The significance of each of the above-tabulated operations will be better understood when the operation of the counter is described hereinbelow. Briefly stated, the W or clear operation is utilized for completely clearing the memory unit in preparing the counter of the invention for use, while the X or mark operation is employed for placing marker bits in the memory unit to designate the sections of channel 76 which are to be utilized as registers for each counter section. The Y or fill operation is then employed for selectively setting initial conditions into the various register sections recorded on the memory drum, after which the Z or count operation is employed for actuating the counter to count in response to input signals received from the input instruments.

The switch arm of fill switch 94 is selectively engageable with any of 20 contacts designated $B_1$ through $B_{20}$, these contacts corresponding to the 20 counter sections incorporated in the counter of the invention. These contacts and their associated switch arm are employed during the Y or fill operation, as hereinafter described, for setting initial conditions into the register sections on the memory drum. The 0 and 1 pushbuttons on switch panel 84 are also employed in conjunction with fill switch 94 during the fill operation and in addition, are also utilized for initiating the clear, mark and count operations.

Before considering further the sequence of operation of the counter of the invention, consideration will next be given to the form in which the individual counter information is recorded on memory drum 66. With reference now to Fig. 7, there is shown the relationship of the various register sections on the memory drum to the commutator segments of the multiplexer unit, and the form in which the individual counter information is recorded in a section of the information channel. In order to illustrate the relationship between the magnetic tracks in the memory unit to the commutator segments in the multiplexer unit, the tracks and commutator segments are laid out longitudinally in Fig. 7, it being understood that the O-bar in the multiplexer unit and magnetic tracks 76 and 78 are continuous, as indicated by the center line 96 appearing at both ends of the magnetic tracks and the O-bar.

It will be recalled from the description of Fig. 2 that each counter section includes an R number register and a Y number register, the registers for storing the R number and Y number of a particular counter section actually constituting an arcuate section of the memory unit's information channel 76 on which the R and Y numbers are interplexed. For purposes of clarity, each of these arcuate sections will hereinafter be termed a register section. It will also be recalled from the description of Fig. 6 that the timing flip-flops $T_1$ and $T_2$ are utilized as a two-stage scale-of-three counter for counting digit time intervals. With reference now to the lower portion of Fig. 7, register section $C_1$ and its R and Y numbers are illustrated in detail as they are recorded on the information channel. Assuming that the R number and Y number each have 20 binary digits, the overall length of the channel section as shown in Fig. 7, is 63 spaces on the memory channel, these spaces being marked into timing intervals $t=0$, $t=1$, and $t=2$ representing the successive states of the scale-of-three counter comprising flip-flops $T_1$ and $T_2$, and more specifically, the time intervals during which the intelligence information stored in the spaces in the information channel is presented as output signals from flip-flop L.

Proceeding from right to left along information channel 76, the first space in the counter register has recorded therein a binary 1 representing a marking bit or fiducial mark, hereinafter designated the $m$ mark to indicate the beginning of the register section. In operation a binary 1 representing signal corresponding to the $m$ mark is presented at the output circuit of flip-flop L during the first $t=0$ timing interval, as shown in Fig. 7. It is clear, therefore, that if every third space following the $m$ mark in the counter register has a signal corresponding to the binary value 0 recorded therein, as signified in Fig. 7 by the dots when $t=0$, then a 0-representing signal is presented at the output circuit of flip-flop L during each of the succeeding $t=0$ timing intervals. Consequently, the presentation of a binary 1-representing signal at the output circuit of flip-flop L during a $t=0$ timing interval is always indicative that the contents of a register section are about to be sequentially reproduced at the output circuit of flip-flop L.

The second information space in the register section is designated P/Q, and as will be described hereinafter, may be magnetized to represent the binary value 1 or binary value 0, depending upon whether the last count performed by the counter section was initiated by an input signal on the $p$ conductor or $q$ conductor, respectively, of the associated input instrument. It will be noted that the P/Q information bit is presented at the output circuit of flip-flop L during the first time interval $t=1$. During the successive $t=1$ timing intervals, as may be seen from Fig. 7, the successive binary digits of the Y number are presented at the output circuit of flip-flop L, the least significant digit $y_1$ being presented first and the most significant digit $y_{20}$ being presented last. Similarly, the digits of the R number recorded on the information channel are presented at the output circuit of the L flip-flop during the $t=2$ timing intervals immediately following the presentation of the Y number digits, the least significant digit $r_1$ following the $y_1$ digit and the most significant digit $r_{20}$ following the $y_{20}$ digit. In addition, as indicated by the expanded register section shown in Fig. 7, the register includes still another space $r_0$ following the P/Q space. This $r_0$ space is employed to prevent a logical error during the count operation when the contents of the P/Q space are modified to indicate a count is to be made.

Inasmuch as each register section includes 63 spaces on the periphery of the memory drum, it is clear from the correlation of drum space to digit time intervals, as described hereinbefore, that timing track 78 must produce 63 clock signals during the interval required for one register section to pass beneath the reading transducer. This correlation is indicated in Fig. 7 by the expanded section of timing track 78, one recorded clock pulse signal being associated with each space in information channel 76.

As previously pointed out, the portion of information channel between the read and write transducers contains the Y and R registers of 20 sequential register sections corresponding to the twenty counter sections. Owing to the fact that the read and write transducers are positioned approximately 180° apart, it is clear that the register sections stored on the drum occupy only one half of the drum circumference, and hence recirculate twice during each revolution of the memory drum. In other words, with brief reference to Fig. 5, information read at reading head 70 may be rewritten on the information channel 180° later in space by recording head 74. Consequently, all of the intelligence information stored in channel 76 is presented at the output circuit of flip-flop L twice during each revolution of memory drum 66. The reason for thus utilizing drum 66 will become more apparent from the description of operation given hereinbelow; briefly stated this feature of the invention permits the registers of each counter section to pass through the counter control unit once when the P segments of multiplexer unit 26 are being sampled by the P-bar, and once while the Q segments are being sampled by the Q-bar. It is clear, of course, that to permit this form of operation the number of clock pulse signals recorded on drum 66 must be equal to $63 \times 20 \times 2$ or 2,520.

Referring once more to Fig. 7 and the composite illustration therein of the relationship between the multiplexer commutator segments and the register sections stored on information channel 76, it will be noted that the above-described double recirculation of the register sections is indicated by the showing of counter registers $C_1$ through $C_{20}$ as occurring twice over the periphery of the drum, once adjacent the P-bar and once adjacent the Q-bar. More particularly, during the first recirculation cycle the appearance of a particular register section at the output circuit of the L flip-flop coincides with the interconnection of the Q-bar with a particular Q segment, while the next appearance of the same register section coincides with the interconnection of the P-bar with the correspondingly designated P segment.

It will be recalled that the P and Q segments are utilized for signifying that a particular counter section is to count in response to an input signal from the correspondingly designated input instrument. It is obvious that if a count is to be performed in a particular counter section, the counter of the invention must be cognizant of this requirement prior to the appearance at the output circuit of the L flip-flop of the contents of the particular counter's register section, since the complete R number in the register may have to be modified. Accordingly, the input conductors from any given input instrument must be sampled prior to the appearance in the counter control unit of the contents of the correspondingly designated register section, and more particularly, should be sampled while the immediately preceding counter section is being operated upon. Thus, as shown in Fig. 7, the P and Q segments are displaced from their correspondingly designated register sections, segments $P_2$ through $P_{20}$ and then $P_1$ being sequentially connected to the P-bar during the first recirculation of the counter registers $C_1$ through $C_{20}$, respectively. Similarly, the $Q_2$ through $Q_{20}$ segments are sequentially connected to the Q-bar while counter register sections $C_1$ through $C_{19}$, respectively, are passing through the counter control unit, while segment $Q_1$ is connected to the Q-bar when counter register $C_{20}$ is passing through the counter control unit. In this manner the P and Q segments may be sampled or scanned for signals immediately prior to the utilization of these signals for initiating a count program, as hereinafter described.

In a similar manner it will be recognized that an output signal cannot be generated by a counter section until its entire R number and Y number have been passed through the counter control unit, since the output signal, as will be recalled from the description of Fig. 2, is actually produced by an overflow signal from the R number register. Consequently, it is clear that a counter output signal from a particular counter section must be distributed to the associated input instrument while the next succeeding register section is being circulated through the counter control unit. Accordingly, as shown in Fig. 7, the $O_1$ through $O_{20}$ output segments are displaced so as to be sequentially connected to the output O-bar while register sections $C_2$ through $C_{20}$, and then $C_1$, respectively, are being circulated through the counter control unit. Similarly, output segments $\bar{O}_1$ through $\bar{O}_{20}$ are also sequentially connected to the O-bar while counter sections $C_2$ through $C_{20}$ and $C_1$ are sequentially circulated through the counter control unit.

Fig. 7 also serves to illustrate in more detail the placement of the R segments with respect to the associated P segments. It will be recalled from the description of Fig. 5 that the R segments are employed for marking on information channel 76 the beginning of each counter section's registers, and more specifically, are employed in conjunction with timing flip-flops $T_1$ and $T_2$ during the X or mark operation for writing the fiducial $m$ mark in the first space of each section of the information channel. Accordingly, the leading edge of each R segment should be connected to the P-bar approximately one half of a digit time interval prior to the appearance under the reading head of the channel space wherein the $m$ mark is to be subsequently recorded. In addition, since the length of each channel section is 63 spaces, the leading edges of adjacent R segments should be displaced by a distance equivalent to 63 spaces on the memory drum.

It will be recognized that since the R segments function to determine the division of the information channel into sections, it is the initial R segment placements on the multiplexer commutator plate which determine the positions of the P, Q and O segments as well as the positions of the associated P-bar, Q-bar and O-bar. The length of each R segment, as shown by segment $R_1$ in the expanded lower portion of Fig. 7, is approximately 3 spaces, although smaller segments may be utilized if desired. The reason for thus restricting the length of each R segment is to insure that only one $t=0$ timing interval occurs during the period when the R segment is interconnected with the P-bar. It should also be pointed out that although the segments $R_1$ through $R_{20}$ are shown in Fig. 7 to be located between adjacent P segments, the brushes in brush unit 82 in Fig. 5 are staggered so that each R segment is connected to the P-bar just prior to the interconnection of the following P segment to the P-bar. The reason for shorting the P segment to the P-bar immediately after the R segment has been contacted is to facilitate the recording of the initial Y numbers in the channel sections during the fill or Y operation as described hereinbelow.

Fig. 7 also illustrates the S segment as being positioned immediately above segment $R_3$. In practice, the length of the S segment is such as to be contacted only during one digit time interval so that in operation the segment may be utilized during the W or clear operation for initially setting the timing of flip-flops $T_1$ and $T_2$. Accordingly, it will be recognized that the S segment need not be positioned over any particular R segment, but need only be positioned relative to the R segments so that a $t=0$ timing interval occurs immediately after any R segment is connected to the associated P-bar.

In preparing the counter of the invention for operation, it is clear that one of the first steps to be undertaken is the determination of the magnitudes of the Y numbers to be placed initially in the register sections during the Y or fill operation. As previously discussed with regard to Fig. 3, the magnitude of each Y number may be readily determined either graphically or by utilizing Equation 1. After these numbers have been determined, or simultaneously therewith, the memory channel of the counter is first cleared and then marked with marker bits designating the beginning of each register section.

As set forth previously, the counter of the invention has four major operations, the W or clear operation, the X or mark operation, the Y or fill operation, and the Z or count operation. In order to most clearly describe the overall operation of the counter, each of the major operations and its subroutines will first be described separately with the input setting functions to the various flip-flops involved in each of the operations being expressed by Boolean algebraic equations. After each of the major operations has been described, the functions previously derived will be combined to produce the composite equations for all of the flip-flops, after which there will be disclosed a diode gating matrix wherein the composite equations are mechanized.

*Clear operation*

The clear operation is performed with operation switch 92 on front panel 84 of Fig. 6 in the W position, and has three principal functions. Firstly, the clear operation is utilized for magnetizing the entire information channel in one direction to record in each space thereof the binary value 0. This function is accomplished by setting recording flip-flop M to its 0-representing state and maintaining it in this state throughout the clear operation, the setting function for flip-flop M being expressible by the following Boolean equation:

$$Z_M = W \cdot c1 \qquad (3)$$

where the dot (.) indicates the logical "and," W represents the operation switch position, and $c1$ represents the reoccurring clock pulse signal.

The second function performed by the clear operation is to set both of the program flip-flops I and J to their 0 states, regardless of what their initial states may have been, in preparation for subsequent operations. Accordingly, the input functions to flip-flops J and I may also be expressed by the logical equations:

$$Z_I = W \cdot c1 \qquad (4)$$
$$Z_J = W \cdot c1 \qquad (5)$$

where the terms W and $c1$ have the same significance as heretofore noted. The setting of the program flip-flops to zero during the clear operation is depicted in Fig. 8, which is a functional flow diagram of the counter of the invention illustrating the various sub-routines performed during each of the major operations of the counter, and the manner in which the sub-routines are initiated. It will be noted from Fig. 8 that the setting of flip-flops I and J to their zero states initiates what will hereinafter be termed an "idle" program or sub-routine which is common to all of the subsequent operations of mark, fill and count.

The third function of the clear operation is to synchronize the $T_1$ and $T_2$ flip-flops with the memory unit by setting each of these flip-flops to its 0-representing state when the S segment is first connected to the P-bar when the operation switch is in the W or clear position. As pointed out previously, the flip-flops $T_1$ and $T_2$ are interconnected as a two-stage scale-of-three binary counter which functions to count in response to the clock pulse signal and which recycles on every third pulse, thereby dividing time into three sequential intervals termed the $t=0$, $t=1$, and $t=2$ timing intervals. The following table indicates the conduction states of $T_1$ and $T_2$ during each of these intervals.

TABLE II

| Timing Interval | State of Flip-flop $T_1$ | State of Flip-flop $T_2$ |
|---|---|---|
| $t=0$ | $T_1'$ | $T_2'$ |
| $t=1$ | $T_1$ | $T_2'$ |
| $t=2$ | $T_1'$ | $T_2$ |

Stated differently, the sequential conduction states of flip-flops $T_1$ and $T_2$ are 00, 10, and 01, corresponding respectively to the intervals 0, 1, and 2. The following logical equations may be utilized to represent the input functions to the $T_1$ and $T_2$ flip-flops:

$$ST_1 = T_1'.T_2'.c1 \qquad (6)$$
$$ZT_1 = (T_1 + W.S_{seg}).c1 \qquad (7)$$
$$ST_2 = T_1.c1 \qquad (8)$$
$$ZT_2 = (T_2 + W.S_{seg}).c1 \qquad (9)$$

where the plus (+) sign represents the logical non-exclusive "or" condition.

It will be recognized from Equation 6 that flip-flop $T_1$ is set to its 1-representing state when flip-flops $T_1$ and $T_2$ are both in their 0-representing state and a clock pulse is received. Similarly Equation 7 denotes that flop-flop $T_1$ is returned to its 0-representing state when a clock pulse is received and the flip-flop is either already in its 1-representing state ($T_1$) "or" the operation is clear (W) and the S segment ($S_{seg}$) is connected to the P-bar. In a like manner Equation 8 denotes that flip-flop $T_2$ is set to its 1-representing state when a clock pulse is received while flip-flop $T_1$ is in its 1-representing state, whereas Equation 9 denotes that flip-flop $T_2$ is returned to its 0-representing state upon receipt of a clock pulse when either the flip-flop is in its 1-representing state "or" the operation is clear and the S segment is connected to the P-bar.

It will also be recognized that flip-flops $T_1$ and $T_2$ are set to their zero state by a signal representing the function ($W.S_{seg}$) only during the first revolution of the memory unit after the clear operation has begun. During subsequent revolutions of the memory unit thereafter, the interconnection of the S segment to the P-bar is superfluous since flip-flops $T_1$ and $T_2$ will be set to their 0-representing states automatically owing to the fact that they have been previously synchronized.

Before describing the mark, fill and count operations and their sub-routines, the operations of program flip-flops I and J will be considered briefly in more detail. It may be recalled that the particular sub-routine performed by the counter is determined by the setting of the front panel switches and the then existing conduction states of program flip-flops I and J, each sub-routine changing automatically, upon its completion, to the succeeding sub-routine.

It will also be recalled that when flip-flops I and J are both in their 0-representing states, the sub-routine being carried out is termed an idle sub-routine, this sub-routine being common to each of the mark, fill and count operations. The term "idle" denotes that while this sub-routine is being carried out, intelligence information read from the information channel and presented at the output circuit of flip-flop L is merely transferred to writing flip-flop M and rerecorded on the information channel. However, as will be described in more detail hereinafter when the Y or fill operation is described, a similar simple recirculation of the recorded intelligence information can also occur during what is termed the "dawdle" subroutine of the fill operation, at which time flip-flops I and J are in their 1 and 0 representing states, respectively. It will be noted that during both the idle and dawdle subroutines flip-flop J is in its 0-representing state when this simple recirculation of information takes place; it will also be recognized from the operation description set forth hereinbelow that the idle and dawdle subroutines are the only subroutines in which the J flip-flop is in its 0-representing state. Accordingly, it is clear that whenever flip-flop J is in its 0-representing state, a simple recirculation of information occurs and the sequential output signals from flip-flop L are merely shifted into flip-flop M and rerecorded on the memory channel. The following partial setting functions for flip-flop M may therefore be written:

$$S_M = J'.L.c1 \qquad (10)$$
$$Z_M = J'.L'.c1 \qquad (11)$$

these functions merely signifying that the contents of the L flip-flop should be transferred to the M flip-flop whenever the J flip-flop is in its 0-representing state.

Mark operation

The mark operation, as set forth previously, is utilized for recording the fiducial mark or marker bit $m$ is the first space of each channel section to designate the beginning of each counter register during subsequent operations. As shown in the functional flow diagram of Fig. 8, the mark operation is initiated by setting operation switch 92 to the X position and pressing down the 1 pushbutton on the switch panel shown in Fig. 6. This, in turn, functions to change the subroutine being performed from "idle" to "mark" by setting the J flip-flop to its 1-representing state. The input function to the J flip-flop is expressed by the following logical equation:

$$S_J = X.I'.J'.1dn.c1 \qquad (12)$$

where X represents the setting of the operation switch and 1dn represents the depression of the 1 pushbutton.

It will be recalled from the description of Figs. 5 and 7 that the twenty R segments in the multiplex unit are utilized in conjunction with the counter control unit, during the mark operation for recording the marker bits on the information channel. More specifically, each time an R segment is interconnected with the P-bar during the mark subroutine of the mark operation, flip-flop P in the counter control unit is set to its 1-representing state in accordance with the following logical expression:

$$S_P = X.I'.J.R_{seg}.c1 \qquad (13)$$

where the term $R_{seg}$ indicates an R-segment is interconnected with the P-bar.

It will also be recalled from the description of Fig. 7 that each R segment extends for approximately 3 spaces or timing intervals and is so placed as to be positively contacted during consecutive intervals when $t=0$ and $t=1$ corresponding to the successive appearance at the output circuit of flip-flop L of signals representing the $m$ mark and the contents of the P/Q space. Now it will be also recalled from Fig. 7 that during the first $t=0$ interval after a register section starts to pass beneath the reading transducer, the $m$ bit is represented by the output signals from the L flip-flop. It is clear, of course, that until the mark operation is performed, no $m$ bits are stored in the memory unit. However, by recognizing the digit time interval when the $m$ bit would be present at the output circuit of the L flip-flop if an $m$ bit were recorded, it is possible to set the M flip-flop to its 1-representing state from the P flip-flop upon receipt of the succeeding pulse signal, thereby simulating a shift of an $m$ mark from the L flip-flop to the M flip-flop. It will be recognized that the digit time interval during which an $m$ bit would appear at the output circuit of the L flip-flop if it were already recorded is expressible by the term ($T_1'.T_2'.P$), where $T_1'.T_2'$ define the time interval $t=0$ and P represents the fact that flip-flop P has been set to its 1-representing state in accordance with Equation 13. Accordingly the M flip-flop is set to its 1-representing state to record an $m$ mark in accordance with the equation $$S_M = X.I'.J.T_1'.T_2'.P.c1 \qquad (14)$$

It is apparent that the M flip-flop is in its 1-representing state throughout subsequent $t=1$ timing intervals as represented by the term $T_1.T_2'$ (see Table II), and is operative to record the $m$ mark in the first space of the associated register section on the information channel. This logical condition may also be utilized to reset flip-flop P to its 0-representing state in accordance with the following equation $$Z_P = T_1.M.c1 \tag{15}$$

It will be recognized that owing to the positioning of the R-segments, Equation 13 cannot be again satisfied to set flip-flop P to its 1-representing state until the next succeeding R-segment is connected to the P bar. It should also be pointed out that the terms X, I' and J have been omitted from Equation 15 owing to the fact that flip-flop P, when in its 1-representing state, will always be returned to its 0-representing state when the next $m$ mark is stored in the M flip-flop for rerecording.

As stated hereinabove, flip-flop M is in its 1-representing state during the $t=1$ time interval for writing the $m$ mark in the register section. In order to simplify the associated gating matrix, flip-flop M may be left in its 1-representing state throughout the succeeding or $t=2$ time interval, thereby recording a binary 1-representing signal in the P/Q space. As will be more clearly understood from the description of the fill operation hereinbelow, the binary digit one stored in the P/Q space during the $t=2$ interval will be employed as the most significant digit of the Y number stored in the register section. At the end of the $t=2$ interval after the restoration of flip-flop P to its 0-representing state, flip-flop M is returned to its 0-representing state in accordance with the function $$Z_M = X.I'.J.P'.L'.c1 \tag{16}$$

The process of recording the $m$ marks is continued throughout the one half of a revolution of the memory drum during which the R-segments are sequentially connected to the P-bar in the multiplexer unit. Accordingly, during the subsequent half revolution where no R segments are present to be contacted, $m$ marks received during the first half revolution must be recirculated through the counter control unit and rewritten on the memory drum. This may be done by setting the M flip-flop to one whenever a binary one is represented by the output signal from the L flip-flop $$S_M = X.I'.J.L.c1 \tag{17}$$

It will be recognized that no additional input function is required to again set flip-flop M to its 0-representing state since Equation 16 will be operative to periodically zero flip-flop M during both half revolutions of the memory drum. It will also be recognized that Equations 14 and 17 may be combined to give the expression $$S_M = X.I'.J.(T_1'.T_2'.P+L).c1 \tag{18}$$

It will be recalled that the mark operation was initiated by depressing the 1 pushbutton on the front switch panel, to set flip-flop J to its 1-representing state. The minimum period through which the pushbutton must remain depressed in order to record all twenty $m$ marks is equal to the period of one revolution of the memory drum, which is, for example, $\frac{1}{30}$ of a second for a drum rotating at 30 r.p.s. After the $m$ marks have been recorded, the 1-pushbutton is released, thereby setting flip-flop J back to its 0-representing condition state in accordance with the equation $$Z_J = X.I'.J.1\text{up}.c1 \tag{19}$$

where the term 1up represents the release of the 1-pushbutton.

As shown in Fig. 8, the setting of flip-flop J to its 0-representing state at the end of the mark subroutine of the mark operation returns the counter of the invention to its idle subroutine wherein both the I and J flip-flops are in their 0-representing states. Accordingly, the $m$ marks recorded on the information channel are merely recirculated through the counter control unit in accordance with Equations 10 and 11 set forth hereinabove; in other words, signals representing the recorded $m$ marks are presented at the output circuit of flip-flop L, are shifted into flip-flop M and are rewritten on the information channel.

*Fill operation*

The fill operation, as heretofore noted, is utilized for inserting each of the predetermined Y numbers into its appropriate register section on the information channel, and will be described with reference to Figs. 5, 6, 7, 8 and 9, Fig. 9 being utilized hereinbelow to illustrate the manner in which one individual register section is filled. Briefly stated, only one register section is filled at a time, the digits of the Y number being sequentially inserted in inverse order. Owing to the fact that a binary one corresponding to the most significant digit of the Y number is already stored in the P/Q space of the register section, upon the selected depression of either the 1 or 0 pushbutton the next most significant digit is recorded first during the fill operation, while the least significant digit $y_1$ is recorded last.

It will also be recalled from the description of Fig. 5, that the P-segments are utilized in both the Y or fill operation and in the Z or count operation. It will also be recalled from Fig. 7 that the numerical designations of the P-segment being contacted at a given instant is different from the numerical designation of the register section simultaneously passing through the counter control unit owing to the fact that during the Z or count operation, the signal to count must be received prior to the recirculation of the register section of the counter section which is to count. During the Y or fill operation, however, the particular register section to be filled is identified by placing a relatively high level voltage on the P segment which is being contacted while the desired register section is being circulated through the counter control unit.

It will also be recalled from the description of Fig. 6 that the fill operation is controlled by setting operation switch 92 to its Y position and by setting fill switch 94 to the switch position corresponding to the register section being filled, the setting of switch 94 functioning only during the Y operation to energize the proper P segment. The following table correlates the switch positions of switch 94 and their corresponding register sections with the particular P segments which are energized when the register sections are being filled.

TABLE III

| Fill switch position | P segment energized | Register section being filled |
|---|---|---|
| B₁ | P₂ | C₁ |
| B₂ | P₃ | C₂ |
| B₃ | P₄ | C₃ |
| . | . | . |
| B₁₈ | P₁₉ | C₁₈ |
| B₁₉ | P₂₀ | C₁₉ |
| B₂₀ | P₁ | C₂₀ |

In order to most clearly describe the fill operation, it will be assumed now that register section 5 is to be filled with the binary Y number 1101 corresponding to the decimal number fourteen. Since the most significant digit has already been recorded in the P/Q space during the mark operation, the next to most significant digit is recorded first during the fill operation. It is clear, therefore, that the sequence in which the digits of the Y number are entered is one, zero, and finally the least significant digit one. The insertion of the first one digit will now be described in detail.

With reference now to the flow diagram of Fig. 8, when the fill operation is started by switching operation switch 92 to the Y position, the counter of the invention remains in the idle subroutine with flip-flops I and J in their 0-states. To change from this subroutine either the 1 or 0 pushbutton must be depressed, the particular pushbutton actuated depending upon the binary value of the digit being inserted. The depression of the 0 or 1 pushbutton performs two separate functions. Firstly, the K flip-flop is set to a conduction state corresponding to the binary value of the digit being inserted, in accordance with the following equations $$S_K = Y.I'.J'.1dn.c1 \tag{20}$$
$$Z_K = Y.I'.J'.0dn.c1 \tag{21}$$

Assuming the first digit to be entered to be a binary one, the 1 pushbutton will of course be depressed and the K flip-flop will be set to its 1-representing state.

The second function performed by depression of the 0 or 1 pushbutton is to set the P flip-flop to its 1-representing state when the particular register section to be filled starts to enter the counter control unit, thereby distinguishing this one particular register section from the rest. The setting function of the P flip-flop is expressed by the equation $$S_P = Y.I'.J'.P_{seg}.(1dn+0dn).c1 \tag{22}$$

where the term ($P_{seg}$) indicates that the P segment energized to fill a predetermined register section has been connected to the P-bar.

Having established by the setting of the P flip-flop to its 1-representing state that the particular register section to be filled is starting through the counter control unit, the subroutine of the counter of the invention is changed from "idle" to "fill," as shown in Fig. 8, by setting the J program register flip-flop to its 0-representing state in accordance with the logical expression $$S_J = Y.I'.J'.L.T_1'.T_2'.P.c1 \tag{23}$$

where the term ($L.T_1'.T_2'$) indicates the $m$ mark is stored in the L flip-flop, and P indicates that the P flip-flop is in its 1-representing state. During the fill subroutine, therefore, flip-flops I and J are in their 0 and 1 representing states, respectively.

Owing to the fact that the $m$ mark is already stored in the L flip-flop prior to the setting of flip-flop J, the $m$ mark is merely shifted into the M flip-flop and recirculated in accordance with Equation 10 in response to the same clock pulse which sets flip-flop J to its 1-representing state. Having set flip-flop J to change the subroutine from idle to fill, flip-flop P may also now be returned to its 0-state on receipt of the succeeding clock pulse in accordance with Equation 15.

With reference now to the expanded register section shown in Fig. 7, during the fill subroutine all of the information bits presented at the output circuit of flip-flop L during the timing intervals $t=0$ and $t=2$ are merely shifted into flip-flop M and rerecorded, since only the Y number digits $y_1$ through $y_{20}$ are affected by the fill operation. The input function to flip-flop M for rerecording the information bits stored in flip-flop L during the $t=0$ timing interval are as follows:

$$S_M = Y.I'.J.L.T_1'.T_2'.c1 \tag{24}$$
$$Z_M = Y.I'.J.L'.T_1'.T_2'.c1 \tag{25}$$

It should be pointed out that Equation 24 is only utilized for recirculating the $m$ mark at the beginning of the succeeding register section, inasmuch as the $m$ mark of the register section being filled has already been rerecorded, and zeros are recorded in every third space following the $m$ space on the information channel.

Insofar as rerecording the $r_1$ through $r_{20}$ information bits of the R number which are presented at the output circuit of flip-flop L during the $t=2$ timing intervals, it will be recognized that all of these bits are zero during the fill operation owing to the fact that an R-number is only created by sequential additional transfers of the Y-number during the subsequent count operation. Accordingly, signals representing binary zeros may be written in the R-number spaces by setting flip-flop M to its 0-representing state during each $t=2$ timing interval in accordance with the equation $$Z_M = Y.I'.J.T_2.c1 \tag{26}$$

where the term $T_2$ represents the $t=2$ timing interval exclusively.

Consider now the writing of the next to most significant digit of the Y-number into the register section. It will be recalled that the digit to be recorded has been stored in flip-flop K in accordance with Equations 20 and 21. The basic concept employed in writing the digits of the Y number is the utilization of the K flip-flop as a buffer stage between the L and M flip-flops once every three digit time intervals. More particularly, while information bits presented at the output circuit of the L flip-flop during the $t=0$ and $t=2$ timing intervals are shifted directly into the M flip-flop, each information bit present at the output circuit of the L flip-flop during the $t=1$ timing interval is shifted into flip-flop K while the information stored in flip-flop K is simultaneously shifted into the M flip-flop. The new bit placed in the K flip-flop is then stored for three digits time intervals and is then in turn shifted into the M flip-flop while a new bit is being shifted from flip-flop L to flip-flop K. The input functions to the K and M flip-flops for performing this operation are expressed as follows:

$$S_K = Y.I'.J.T_1.L.c1 \tag{27}$$
$$Z_K = Y.I'.J.T_1.L'.c1 \tag{28}$$
$$S_M = Y.I'.J.T_1.K.c1 \tag{29}$$
$$Z_M = Y.I'.J.T_1.K'.c1 \tag{30}$$

It will be recognized that since the K flip-flop was initially set to its 1-representing state by depression of the 1 pushbutton, a signal representing the binary value 1 will be shifted into the M flip-flop immediately after the storage therein of the $m$ mark. Consequently, with reference to Fig. 7, a binary 1 is recorded in the P/Q space, while the one previously recorded in the P/Q space and the zeros previously recorded in the $y_1, y_2, \ldots y_{18}$ and $y_{19}$ spaces are shifted, as the contents of the register section are circulated through the counter control unit, into the $y_1, y_2, y_3, \ldots y_{19}$ and $y_{20}$ spaces, respectively.

After the counter section has been circulated through the counter control unit, the $m$ mark of the next succeeding counter section is shifted into the L flip-flop, and is recognized by the condition that flip-flop L is in its 1-representing state during a $t=0$ time interval ($L.T_1'.T_2'$). Since the succeeding register section is not being filled, it is essential to change from the fill subroutine being carried out. Since, however, the 1-pushbutton is still depressed, the counter of the invention cannot be returned to its idle subroutine because to do so would permit the fill subroutine to be carried out again when the register section being filled is again circulated through the counter control unit. Accordingly, the appearance of the succeeding register's $m$ mark is utilized to change the counter of the invention from its fill subroutine to a "dawdle" subroutine by setting flip-flop J to its 0-representing state and simultaneously setting flip-flop I to its 1-representing state. These input functions are expressible by the following logical equations:

$$Z_J = Y.I'.J.L.T_1'.T_2'.c1 \tag{31}$$
$$S_I = Y.I'.J.L.T_1'.T_2'.c1 \tag{32}$$

It will be recalled that during the dawdle subroutine, briefly mentioned hereinabove with regard to Equations 10 and 11, all information bits in each register section are simply recirculated through the counter control unit, each bit stored in flip-flop L being shifted into flip-flop M. The dawdle subroutine is continued until the 1-pushbutton, depressed to start the fill subroutine, is released. As shown in the flow diagram of Fig. 8, both the 0 and 1 pushbuttons in their up position are then operative to return the counter of the invention to its idle subroutine by resetting flip-flop I to its 0-representing state in accordance with equation $$Z_1 = Y.I.J'.1up.0.up.c1 \quad (33)$$

The counter of the invention is now ready to record the next Y digit to be inserted in the particular register being filled. Assuming as hereinabove that the Y number 1101 is being inserted in the register section of counter section 5, the 0-pushbutton is next depressed to initiate the fill operation, the depression of the 0-pushbutton functioning to set flip-flop K to its 0-representing state in accordance with Equation 21, and to set flip-flop P to its 1-representing state in accordance with Equation 22 when the particular register section being filled starts through the counter control unit. Thereafter, the counter of the invention operates in the manner described hereinbefore to shift the binary 0 stored in the K flip-flop into the P/Q space, and the binary ones previously stored in the P/Q and $y_1$ spaces into the $y_1$ and $y_2$ spaces, respectively.

Figures 9, 10:
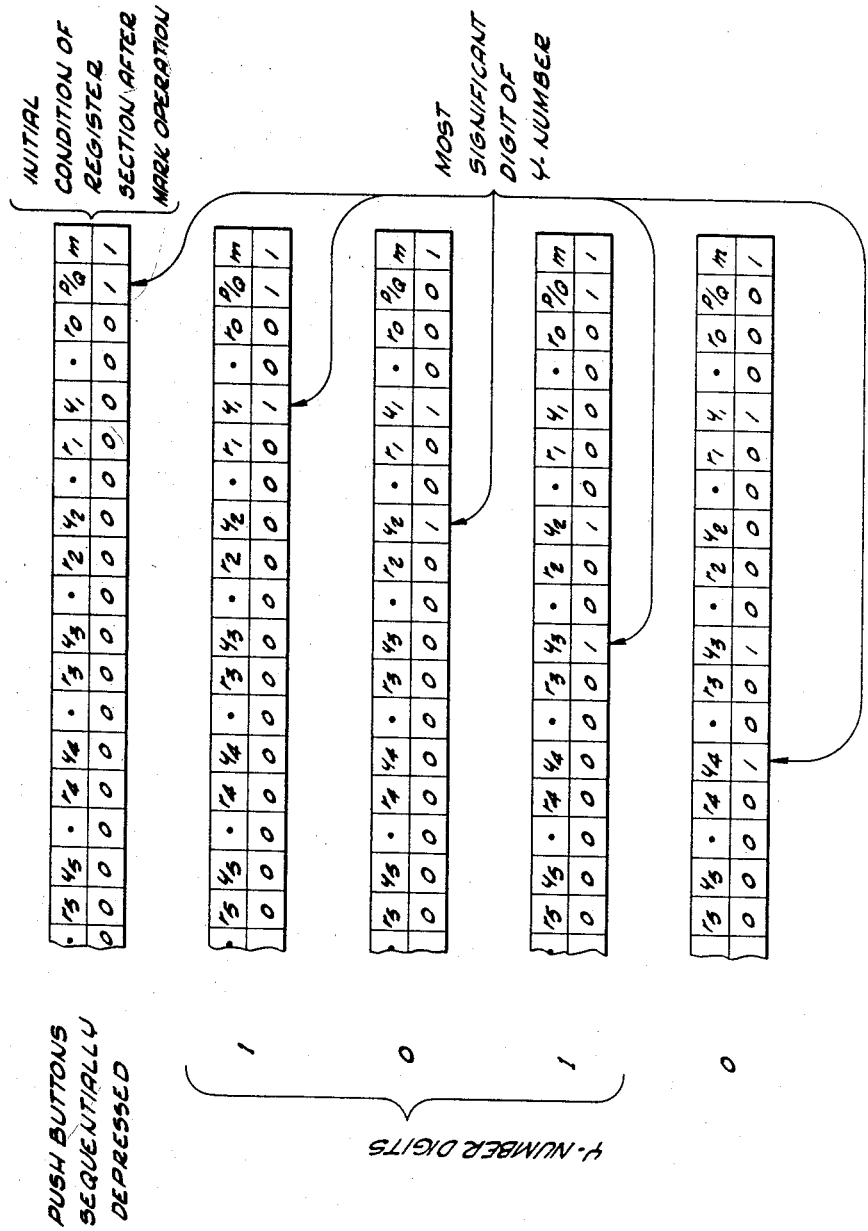
Fig. 9 is a diagrammatic view of a portion of the memory unit illustrating the sequence in which the numerical weighting factors are initially entered into the counter system.

With reference now to Fig. 9, a portion of a register section is illustrated to show the sequence in which the Y-number 1101 corresponding to the decimal number 14 is stored in the register section. The register section is shown at the top of Fig. 9 as it appears after the mark operation has been completed. During the fill operation, the 1-pushbutton is first used to store a binary 1 in the P/Q space, the 1 digit recorded in the P/Q space during the mark operation being shifted into the $y_1$ space.

When the 0-pushbutton is next depressed, the contents of the P/Q and $y_1$ spaces are shifted into the $y_1$ and $y_2$ spaces and a 0 is written in the P/Q space. Similarly, another depression of the 1-pushbutton functions to record a 1 in the $y_3$, $y_2$ and P/Q spaces, and a 0 in the $y_1$ space.

It will be recognized from Fig. 9 that after all of the digits of the Y number have been entered in the desired register section, they are still not in their proper spaces, but are displaced one digit, the least significant binary digit being stored in the P/Q space. Accordingly, after all of the digits of the Y number have been entered, the 0-pushbutton is depressed once more, as shown at the bottom of Fig. 9, to shift the least significant digit of the Y number into the $y_1$ space as desired. After each register section has been thus filled with its desired Y number, the counter of the invention is ready to be switched to its count operation.

*Count operation*

After the fill operation has been completed, operation switch 92 is switched to the Z or count position in preparation for the count operation. As shown by the flow diagram of Fig. 8, program flip-flops I and J remain in their 0-representing states corresponding to the idle subroutine until the 1-pushbutton is depressed; consequently the information stored in the register sections is merely recirculated through the counter control unit in accordance with Equations 10 and 11. As shown in Fig. 8, depression of the 1-pushbutton changes the counter from its idle subroutine to a test subroutine by setting the J flip-flop to its 1-representing state upon the appearance of an $m$ mark at the output circuit of the L flip-flop, the input function to flip-flop J being as follows $$S_J = Z.I'.J'.T_1'.T_2'.L.1dn.c1 \quad (34)$$

After the test subroutine has been initiated, a test is made each time the contents of a register section's P/Q space appear at the output circuit of the L flip-flop in order to determine if a count should take place, or in other words, if the Y number should be additively transferred to the R number. If the test indicates no count is to take place, program flip-flops I and J remain in their 0 and 1 representing states, respectively, and the counter "waits," as indicated by the wait subroutine shown in Fig. 8, to test the succeeding counter section to see if a count should take place. During the wait subroutine, of course, the contents of the particular register section being presented at the output circuit of flip-flop L are merely shifted to flip-flop M and are rewritten. If, on the other hand, the test indicates a count is to take place, flip-flop I is set to its 0-representing state, as described hereinafter, to indicate a count subroutine wherein the contents of the Y register are additively transferred to the R register. Upon the appearance of the succeeding register section the I flip-flop is again returned to its 0-representing state in order to perform the test operation for the succeeding counter section. Consider now the test operation in more detail. It will be recalled that the P and Q segments are utilized for applying the $p$ and $q$ signals from the input instruments to the P-bar and Q-bar, respectively, of the multiplexer unit. It will also be recalled from the description of Fig. 7 that the connection of a particular P or Q segment to the P-bar or Q-bar occurs immediately prior to the passage of the correspondingly designated register section through the counter control unit. Upon receipt of an input signal at the P-bar, the flip-flop P is set to its 1-representing state, while the receipt of a signal at the Q-bar sets the Q flip-flop to its 1-representing state, these functions being expressible by the following Boolean equations:

$$S_P = Z.P_{seg}.c1 \quad (35)$$

$$S_Q = Z.Q_{seg}.c1 \quad (36)$$

As previously set forth, the contents of the P/Q space are employed to indicate whether the last count was initiated by a $p$-signal or a $q$-signal. More specifically if the last count was initiated by a $q$ signal, a binary 0 is stored in the P/Q space, whereas a binary 1 is stored in this space if the last count was occasioned by a $p$-signal. Thus, during the test subroutine of the counter, the digit stored in the P/Q space, when presented at the output circuit of flip-flop L, is compared with the state of the P and Q flip-flops to determine if the count subroutine should be initiated, the count subroutine being initiated each time the input signal received differs from the previous input signal on which a count occurred. If a count is indicated, a new P/Q digit of the opposite value is recorded, whereas the old P/Q digit is rerecorded as the new P/Q digit if no count is indicated. The operation of the counter in thus conducting the test operation may be represented by the following truth table.

TABLE IV

| Old P/Q | P | Q | New P/Q | Count S | Remarks |
|---|---|---|---|---|---|
| 0 | 0 | 0 | 0 | 0 | No P or Q segment contacted—no input signal, no change in P/Q. |
| 0 | 0 | 1 | 0 | 0 | No count since last count occurred in Q, no change in P/Q. |
| 0 | 0 | 0 | 1 | 1 | Count—change P/Q. |
| 0 | 1 | 1 | ----- | ----- | Omit—P and Q cannot be 1 simultaneously. |
| 1 | 0 | 0 | 1 | 0 | No P or Q segment contacted—no input signal, no change in P/Q. |
| 1 | 0 | 1 | 0 | 1 | Count—change P/Q. |
| 1 | 1 | 0 | 1 | 0 | No count since last count occured in P no change in change in P/Q. |
| 1 | 1 | 1 | ----- | ----- | Omit—P and Q cannot be 1 simultaneously. |

It will be recalled that the P/Q space digit is presented at the output circuit of flip-flop L when the $m$ mark is in flip-flop M, or when the condition $(T_1.M)$ is satisfied.

It will be recognized from the foregoing table that the setting functions for flip-flop M to record the new P/Q digit are as follows:

$$S_M = Z.I'.J.T_1.M.Q'.(P+L).c1 \quad (35.5)$$

$$Z_M = Z.I'.J.T_1.M.P'.(Q+L').c1 \quad (36.5)$$

However, owing to the fact that the M flip-flop is already in its 1-representing state because the $m$ mark is stored therein, Equation 35.5 is superfluous and Equation 36.5 alone is sufficient to insure that the proper P/Q bit is recorded; in other words, if the M flip-flop is not zeroed, a binary one will be recorded in the P/Q space.

Assume now that the test subroutine has indicated no count or additive transfer should occur. As stated previously, the remainder of the register section should then be merely shifted from flip-flop L into flip-flop M to be rerecorded, the setting functions for flip-flop M being as follows $$S_M = Z.I'.J.L.(T_1' + T_1.M').c1 \qquad (37)$$

$$Z_M = Z.I'.J.L'.(T_1' + T_1.M').c1 \qquad (38)$$

where the function $L.(T_1' + T_1.M')$ indicates that the contents of the L flip-flop should be shifted to the M flip-flop during each digit time interval except when the P/Q digit is in the L flip-flop, at which time Equations 35.5 and 36.5 are utilized for setting the M flip-flop.

During the same digit time interval that the new P/Q digit is transferred to the M flip-flop, the P and Q flip-flops are also zeroed in accordance with the following equation $$Z_P = Z_Q = T_1.M.c1 \qquad (39)$$

It will be recognized that Equation 39 is identical with Equation 15 and merely signifies that whenever the $m$ mark is in the M flip-flop to be rerecorded, a zeroing signal should be applied to both of flip-flops P and Q so that if one of them is in its 1-representing state it will be reset to its 0-representing state. Accordingly, while the remainder of the counter section just tested is being recirculated in accordance with Equations 37 and 38, the P and Q flip-flops are then ready to receive either a $p$-signal or a $q$-signal from the input instrument associated with the succeeding counter section to be tested.

Consider now the operation of the counter of the invention when a count is to be performed. It will be noted from Table III that a count is initiated whenever either the P flip-flop is in its 1-representing state and the old P/Q digit is zero, indicating the last count was initiated by a $q$-signal, or the Q flip-flop is in its 1-representing state and the old P/Q digit is 1 indicating the last count was initiated by a $p$-signal. When a count is indicated by either of these conditions being satisfied the I program flip-flop is set to its 1-representing state, the input setting function being represented by the equation $$S_I = Z.I'.J.M.T_1.(L'.P + L.Q).c1 \qquad (40)$$

As shown in the flow diagram of Fig. 8, the setting of the I flip-flop to its 1-representing state initiates the count subroutine wherein the Y number in a particular register section is additively transferred to the R number in the same counter section. The actual process of addition occurs each $t=2$ time interval when a digit of the Y number is in the M flip-flop to be rerecorded, and the correspondingly weighted R digit is in the L flip-flop, the K flip-flop being utilized for storing carry digits until the next higher weighted digits of the Y and R numbers are added together. Since the Y number itself is to remain unchanged and the zeros presented at each $t=0$ time interval except the first should be retained, it will be recognized that during the count subroutine the information bits presented at the output circuit of the L flip-flop during the $t=1$ and $t=0$ time intervals should be merely shifted into the M flip-flop to be rerecorded. This shift function may be expressed by the following logical equations $$S_M = Z.I.J.L.T_2'.c1 \qquad (41)$$

$$Z_M = Z.I.J.L'.T_2'.c1 \qquad (42)$$

where the term $T_2'$ defines both the $t=0$ and $t=1$ time intervals.

During time interval $t=2$, on the other hand, the $r$ digit presented at the output circuit of the L flip-flop may not be the same as the binary digit which is to be stored in the M flip-flop for recording during the succeeding digit time interval. The following table illustrates the conventional process of addition in binary numbers and is useful in correlating the various functions generated in carrying out the additive process.

TABLE V

| Old $r$-digit stored in L flip-flop | $y$ digit stored in M flip-flop | Old carry digit stored in K flip-flop | Sum new $r$ digit to be stored in M flip-flop | Carry new carry digit to be stored in K flip-flop |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

From the above table the input functions to the M flip-flop for writing the new $r$ digit may be written as:

$$S_M = Z.I.J.T_2.[L'.M'.K + L'.M.K' + L.M'.K' + L.M.K].c1 \qquad (43)$$

$$Z_M = Z.I.J.T_2[L'.M'.K' + L'.M.K + L.M'.K + L.M.K'].c1 \qquad (44)$$

It will be recognized by those familiar with the simplification and transformation of logical equations that Equations 43 and 44 may be greatly simplified. More specifically, in Equation 43 the terms $(L'.M.K')$ and $(L.M.K)$ can be omitted because these terms include the term M which signifies that the M flip-flop is already in its 1-representing state. In a similar manner, the terms $(L'.M'.K')$ and $(L.M'.K)$ may be omitted from Equation 44. Accordingly, by dropping these terms and factoring the terms M' and M from Equations 43 and 44 respectively, these equations become:

$$S_M = Z.I.J.T_2.M'.[L'.K + L.K'].c1 \qquad (45)$$

$$Z_M = Z.I.J.T_2.M.[L'.K + L.K'].c1 \qquad (46)$$

Table V may also be utilized to ascertain the input functions to flip-flop K for setting in the new carry digit, these functions being represented by the equations:

$$S_K = Z.I.J.T_2.[L'.M.K + L.M'.K + L.M.K' + L.M.K].c1 \qquad (47)$$

$$Z_K = Z.I.J.T_2.[L'.M'.K' + L'.M'.K + L'.M.K' + L.M'.K'].c1 \qquad (48)$$

As discussed hereinabove with regard to the simplification of Equations 43 and 44, Equation 47 may be simplified by omitting the terms $(L'.M.K)$, $(L.M'.K)$ and $(L.M.K)$, while Equation 48 may be simplified by the omission of the terms $(L'.M'.K')$, $(L'.M.K')$ and $(L.M'.K')$, these omissions being allowable because they stipulate as a logical proposition that the K flip-flop is already in the conduction state which the function represented by the equation is to set the flip-flop. Accordingly, Equations 47 and 48 may be rewritten as $$S_K = Z.I.J.T_2.L.M.K'.c1 \qquad (49)$$

$$Z_K = Z.I.J.T_2.L'.M'.K.c1 \qquad (50)$$

It will be recognized by those skilled in the art that Equations 45, 46, 49 and 50 may be further simplified by omitting the terms M', M, K' and K, respectively. However, in Equations 45 and 46 it may be desirable to retain these terms if it is desired to prevent triggering of the flip-flop, or in other words, the simultaneous pulsing of both inputs to a flip-flop.

From the foregoing equations and Table V it will be recognized that the entire Y number is added to the R number stored in the register section each time the count subroutine is initiated, the addition process occurring sequentially from the least significant binary digit to the most significant binary digit with the carry signal from each individual addition being stored in the K flip-flop to be added into the succeeding addition. There is one subtlety in the addition process, however, as will now be described.

It will be recalled from Equation 40 that the count subroutine is initiated when the P/Q digit is in the L flip-flop, or in other words at the end of the first $t=1$ timing interval. Thereafter, as indicated by Equations 45, 46, 49 and 50, an addition of binary digits occur every $t=2$ timing interval. With reference to the expanded register section shown in Fig. 7, however, it will be recognized that during the first $t=2$ time interval the P/Q digit is in the M flip-flop while the $r_0$ is in the L flip-flop. Since the least significant digits of the R and Y members are $r_1$ and $y_1$, respectively, it is apparent that unless provision is made to supress any carry digit which might result from the addition of $r_0$ and the P/Q digit, an extra digit may be added to the R number during the subsequent additive transfers.

Assume, for example, that prior to the performance of the count subroutine the contents of the $r_0$ and P/Q spaces are both binary zeros. When the count subroutine is initiated, the P/Q digit is changed to a binary one, in accordance with Equations 45 and 46, is added to the $r_0$ digit to produce a new $r_0$ digit having a binary value of one. As yet no carry signal is generated. On the succeeding count subroutine on the same register section, the P/Q digit would be returned to a binary zero and again added to the $r_0$ digit, which would now normally have a binary value of one. Again the additive process would produce an $r_0$ digit of one and no carry digit. On the succeeding count subroutine, however, when the P/Q digit is returned to a binary one and the $r_0$ digit is also a binary one, if left unchanged the additive process will set up a carry digit in the K flip-flop, and this carry digit would be included in the addition of the least significant digits $y_1$ and $r_1$ of the Y number and R number.

In order to prevent the generation of this carry signal during the count subroutine, the L flip-flop is always set to zero at the time when the $r_0$ digit is normally being shifted into the flip-flop. Consequently, even if the $r_0$ digit generated by the additive process for a particular counter section has a binary value of one, during the next count subroutine performed on the same counter section an $r_0$ digit having a value of zero is simulated. The input functions to the L flip-flop may thus be written as $$S_L = A.(I' + J' + T_1' + M').c1 \qquad (51)$$

$$Z_L = (A' + Z.I.J.T_1.M)c1 \qquad (52)$$

which merely signifies that the digit stored in the A flip-flop is always shifted into the L flip-flop except during the first $t=1$ timing interval after a count subroutine has been initiated, in which instance the L flip-flop is always zeroed.

Returning once more to the general operation of the counter of the invention during the count subroutine, consider now the operational sequence when the most significant binary digits $r_{20}$ and $y_{20}$ are being added together. Clearly, the new $r_{20}$ digit is merely generated in accordance with Equations 45 and 46 and is set into the M flip-flop to be recorded. Simultaneous therewith, however, the $m$ mark of the succeeding counter section is stored in the L flip-flop. Inasmuch as the I and J flip-flops are both still in their 1-representing states corresponding to the count subroutine, and the succeeding bit to enter the L flip-flop will be the P/Q digit of the succeeding counter section, it is clear that the counter control circuit must be returned immediately to its test subroutine, as shown in Fig. 8, in order to determine if the succeeding counter section requires a count subroutine or a wait subroutine. The return of the counter control unit to its test subroutine is accomplished by merely returning program flip-flop I to its zero representing state upon the appearance at the output circuit of the L flip-flop of a signal representing the succeeding $m$ mark. This function is expressed by the logical equation:

$$Z_I = Z.I.J.L.T_1'.T_2'.c1 \qquad (53)$$

In the foregoing description of the count operation, it has been assumed that during the performance of the count subroutine the R register did not overflow, or in other words, that no carry digit was generated by the addition of the digits $r_{20}$ and $y_{20}$. Assume now, however, that the count subroutine has occurred in a particular counter section the desired number of times, and that an output signal is to be returned to the associated input instrument to indicate the attainment of the desired predetermined count. If the Y number initially entered into the associated register section is of the proper value, an overflow carry digit is set into carry flip-flop K in accordance with Equation 49 upon the addition of the $r_{20}$ and $y_{20}$ digits. Accordingly, during the subsequent digit time interval when the $m$ mark of the next succeeding counter section is stored in the L flip-flop, the output or O flip-flop is set to its 1-representing state in accordance with the equation:

$$S_O = Z.I.J.K.L.T_1'.T_2'.c1 \qquad (54)$$

By connecting the output circuit of the O flip-flop to the O-bar in the associated multiplier unit 26, shown in Fig. 4, the change in output voltage of the O flip-flop is communicated to the proper input instrument to indicate that the desired count has been achieved.

It will be recognized, of course, that the K flip-flop must be returned to its 0-representing state at the same time that flip-flop O is being set to 1, since no carry signal should be stored initially in the K flip-flop if the count subroutine is again carried out on the succeeding counter section. This function is given by the equation:

$$Z_K = Z.I.J.L.T_1'.T_2'.c1 \qquad (55)$$

It will also be recognized that when an output signal is generated, the O flip-flop may be left in its 1-representing state over the entire interval that the contents of the succeeding register section are entering the counter control unit, and need only be restored to its 0-representing state upon the appearance at the output circuit of the L flip-flop of a signal representing still the next $m$ digit. Thus the reset function for the O flip-flop is given by the equation $$Z_O = K'.L.T_1'.T_2'.c1 \qquad (56)$$

It will be recognized from Equation 56 that if the succeeding counter section also produced an overflow or output signal after the preceding section had generated an output signal, the O flip-flop cannot be zeroed owing to the fact that flip-flop K would be in its 1-representing state and Equation 56 cannot be satisfied. Consequently, flip-flop O will then remain in its 1-representing state, as desired, and thereby transmit an output signal to two output instruments in succession.

In the particular embodiment of the invention shown in the drawings, the Z or count operation may be continued at will until all of the input instruments have received an output signal, and may even be continued thereafter if desired, since the counter sections will continue to count, upon receipt of proper input signals, even after the generation of an output signal. It is to be expressly understood, therefore, that the counter embodiment shown in the drawings is intended only to illustrate the basic concepts of the invention, and is not intended to limit the structure and applications of the invention.

*Composite counter equations*

In the foregoing operational description of the invention, each logical setting function was set forth individually in the sequence in which it is employed for generating the desired flip-flop setting signal. In constructing the counter of the invention, the flip-flop input functions set forth may be mechanized individually, but are preferably combined in simplified composite input functions to eliminate duplication of electrical components and to simplify the electrical gating circuitry.

Consider now the composite input functions to flip-flop M. Combining Equations 10, 18, 24, 29, 37, 41 and 45, the combined function for setting flip-flop M to its 1-representing state is given by the equation:

$$S_M=[J'.L+X.I'.J.(T_1'.T_2'.P+L)+Y.I'.J.L.T_1'.T_2' \\ +Y.I'.J.T_1.K+Z.I'.J.L.(T_1'+T_1.M')+Z.I.J.L.T_2' \\ +Z.I.J.T_2.M'.(L'.K+L.K')].c1 \quad (57)$$

In a similar manner, combining Equations 3, 11, 16, 25, 26, 30, 36.5, 38, 42 and 46 gives the combined function for zeroing the M flip-flop.

$$Z_M=[W+J'.L'+X.I'.J.P'.L'+Y.I'.J.L'.T_1'.T_2'+Y.I'.J.T_2 \\ +Y.I'.J.T_1.K'+Z.I'.J.T_1.M.P'.(Q+L') \\ +Z.I'.J.L'.(T_1'+T_1.M')+Z.I.J.L'.T_2' \\ +Z.I.J.T_2.M.(L'.K+L.K')].c1 \quad (58)$$

Factoring Equations 57 and 58, combining terms and simplifying according to the well known rules of Boolian algebra, these equations become:

$$S_M=[J'.L+X.I'.J.(T_1'.T_2'.P+L)+Y.I'.J.(T_1.K \\ +T_1'.T_2'.L)+Z.I'.J.L.(T_1'+M')+Z.I.J.(L.T_2' \\ +T_2.M'.(L'.K+L.K'))].c1 \quad (59)$$

$$Z_M=[W+J'.L'+X.I'.J.P'.L'+Y.I'.J.(T_1.K'+T_2) \\ +Z.I'.J.(T_1.M.P'.(Q+L')+L'.T_1')+Z.I.J.(L'.T_2' \\ +T_2.M.(L'.K+L.K'))].c1 \quad (60)$$

Consider next the composite input functions to program flip-flops I and J. Combining Equations 12, 23 and 34 gives the following one setting input function to flip-flop J.

$$S_J=[X.I'.J'.1dn+Y.I'.J'.L.T_1'.T_2'.P \\ +Z.I'.J'.L.T_1'.T_2'.1dn].c1 \quad (61)$$

In a similar manner, combining Equations 5, 19 and 31 gives the following zero-setting input function to flip-flop J:

$$Z_J=[W+X.I'.J.1up+Y.I'.J.L.T_1'.T_2'].c1 \quad (62)$$

The composite input function to flip-flop I, on the other hand, may be obtained by combining Equations 32 and 40; and 4, 33 and 53 as follows:

$$S_I=[Y.I'.J.L.T_1'.T_2'+Z.I'.J.M.T_1.(L'.P+L.Q)].c1 \quad (63)$$

$$Z_I=[W+Y.I.J'.1up.0up+Z.I.J.L.T_1'.T_2].c1 \quad (64)$$

Factoring Equations 61 through 64 and combining and simplifying terms, these equations become:

$$S_J=[I'.J'.(L.T_1'.T_2'.(Y.P+Z.1dn)+X.1dn)].c1 \quad (65)$$

$$Z_J=[W+I'.J.(X.1up+Y.L.T_1'.T_2')].c1 \quad (66)$$

$$S_I=[I'.J.(Y.L.T_1'.T_2'+Z.M.T_1.(L'.P+L.Q))].c1 \quad (67)$$

$$Z_I=[W+I.(Y.J'.1up.0up+Z.J.L.T_1'.T_2')].c1 \quad (68)$$

In a like manner the input functions to the K flip-flop may be obtained by combining Equations 20, 27 and 49, and Equations 21, 28, 50 and 55 as follows:

$$S_K=[Y.I'.J'.1dn+Y.I'.J.L.T_1 \\ +Z.I.J.T_2.L.M.K'].c1 \quad (69)$$

$$Z_K=[Y.I'.J'.0dn+Y.I'.J.L'.T_1+Z.I.J.T_2.L'.M'.K \\ +Z.I.J.L.T_1'.T_2'].c1 \quad (70)$$

Equation 70 may be factored and simplified to give $$Z_K=[Y.I'.J'.0dn+Y.I'.J.L'.T_1+Z.I.J.(T_2.L'.M'.K \\ +L.T_1'.T_2')].c1 \quad (71)$$

In a similar manner the "set to one" function for flip-flop P may be obtained by Equations 13, 22 and 35 as follows:

$$S_P=[X.I'.J.R_{seg}+Y.I'.J'.P_{seg}.(1dn \\ +0dn)+Z.P_{seg}].c1 \quad (72)$$

The zero-setting function to flip-flop P, it will be recalled, is merely defined by Equation 15.

The input functions to the remainder of the flip-flops in the counter control unit have previously been expressed in their simplified form. In order to facilitate the analysis of the logical gating networks described hereinafter, the simplified input setting functions to all of the flip-flops in the counter control unit are set forth below:

$$ST_1=T_1'.T_2'.c1 \quad (6)$$

$$ZT_1=(T_1+W.S_{seg}).c1 \quad (7)$$

$$ST_2=T_1.c1 \quad (8)$$

$$ZT_2=(T_2+W.S_{seg}).c1 \quad (9)$$

$$S_L=A.(I'+J'+T_1'+M').c1 \quad (51)$$

$$Z_L=(A'+Z.I.J.T_1.M).c1 \quad (52)$$

$$S_M=[J'.L+X.I'.J.(T_1'.T_2'.P+L)+Y.I'.J.(T_1.K \\ +T_1'.T_2'.L)+Z.I'.J.L.(T_1'+M')+Z.I.J.(L.T_2' \\ +T_2.M'.(L'.K+L.K'))].c1 \quad (59)$$

$$Z_M=[W+J'.L'+X.I'.J.P'.L'+Y.I'.J.(T_1.K'+T_2) \\ +Z.I'.J.(T_1.M.P'.(Q+L')+L'.T_1')+Z.I.J.(L'.T_2' \\ +T_2.M.(L'.K+L.K'))].c1 \quad (60)$$

$$S_J=[I'.J'.(L.T_1'.T_2'.(Y.P+Z.1dn)+X.1dn)].c1 \quad (65)$$

$$Z_J=[W+I'.J.(X.1up+Y.L.T_1'.T_2')].c1 \quad (66)$$

$$S_I=[I'.J.(Y.L.T_1'.T_2'+Z.M.T_1.(L'.P+L.Q))].c1 \quad (67)$$

$$Z_I=[W+I.(Y.J'.1up.0up+Z.J.L.T_1'.T_2')].c1 \quad (68)$$

$$S_K=[Y.I'.J'.1dn+Y.I'.J.L.T_1 \\ +Z.I.J.T_2.L.M.K'].c1 \quad (69)$$

$$Z_K=[Y.I'.J'.0dn+Y.I'.J.L'.T_1+Z.I.J.(T_2.L'.M'.K \\ +L.T_1'.T_2')].c1 \quad (71)$$

$$S_P=[X.I'.J.R_{seg}+Y.I'.J'.P_{seg}.(1dn \\ +0dn)+Z.P_{seg}].c1 \quad (72)$$

$$Z_P=T_1.M.c1 \quad (15)$$

$$S_Q=Z.Q_{seg}.c1 \quad (36)$$

$$Z_P=Z_Q=T_1.M.c1 \quad (39)$$

$$S_O=Z.I.J.K.L.T_1'.T_2'.c1 \quad (54)$$

$$Z_O=K'.L.T_1'.T_2'.c1 \quad (56)$$

*Mechanization of composite equations*

Figure 10A:
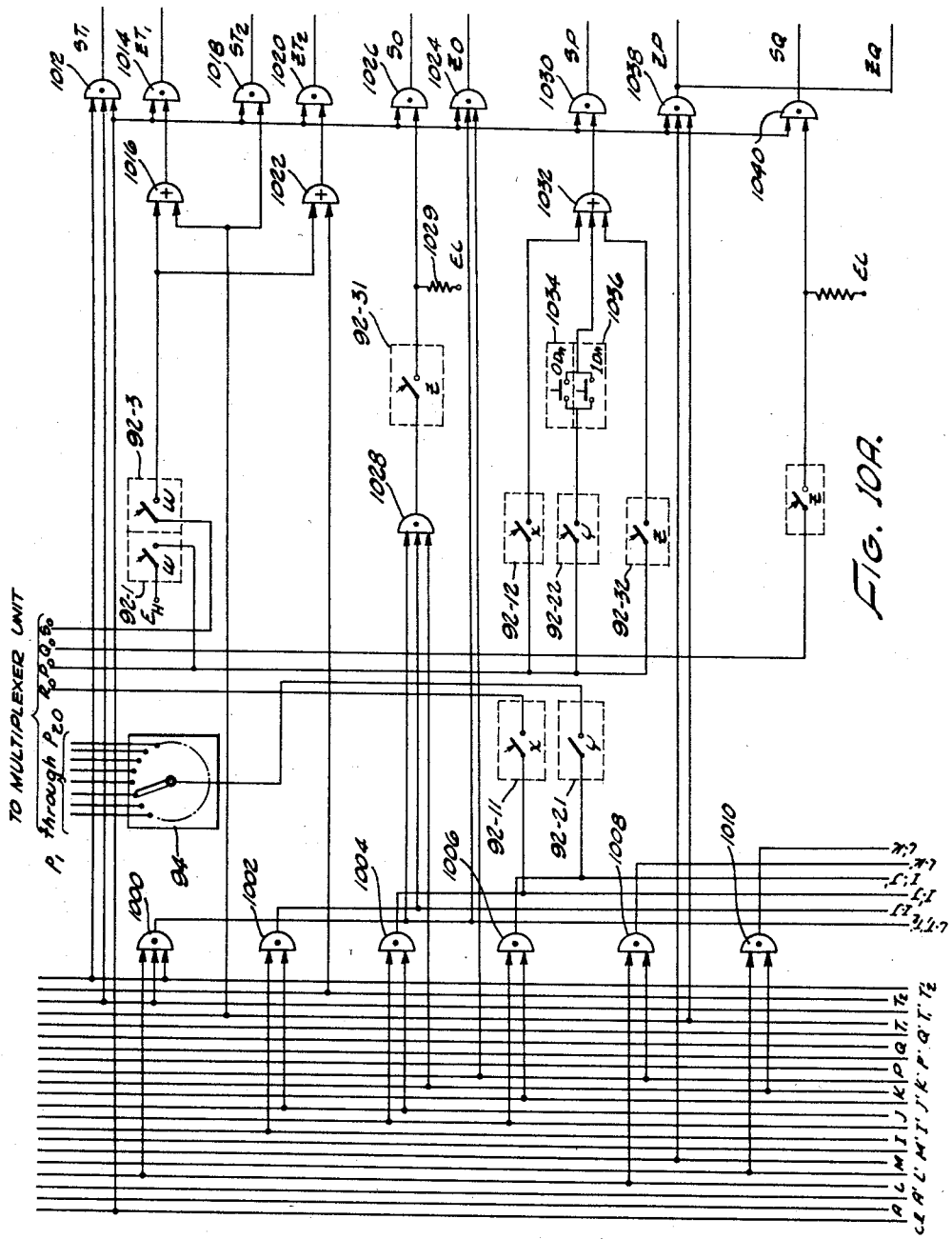
Figs. 10A, 10B and 10C, which are interrelated as shown in Fig. 10, are schematic diagrams of one form of gating network which may be utilized in the counter control unit shown in Fig. 6.
Figure 10B:
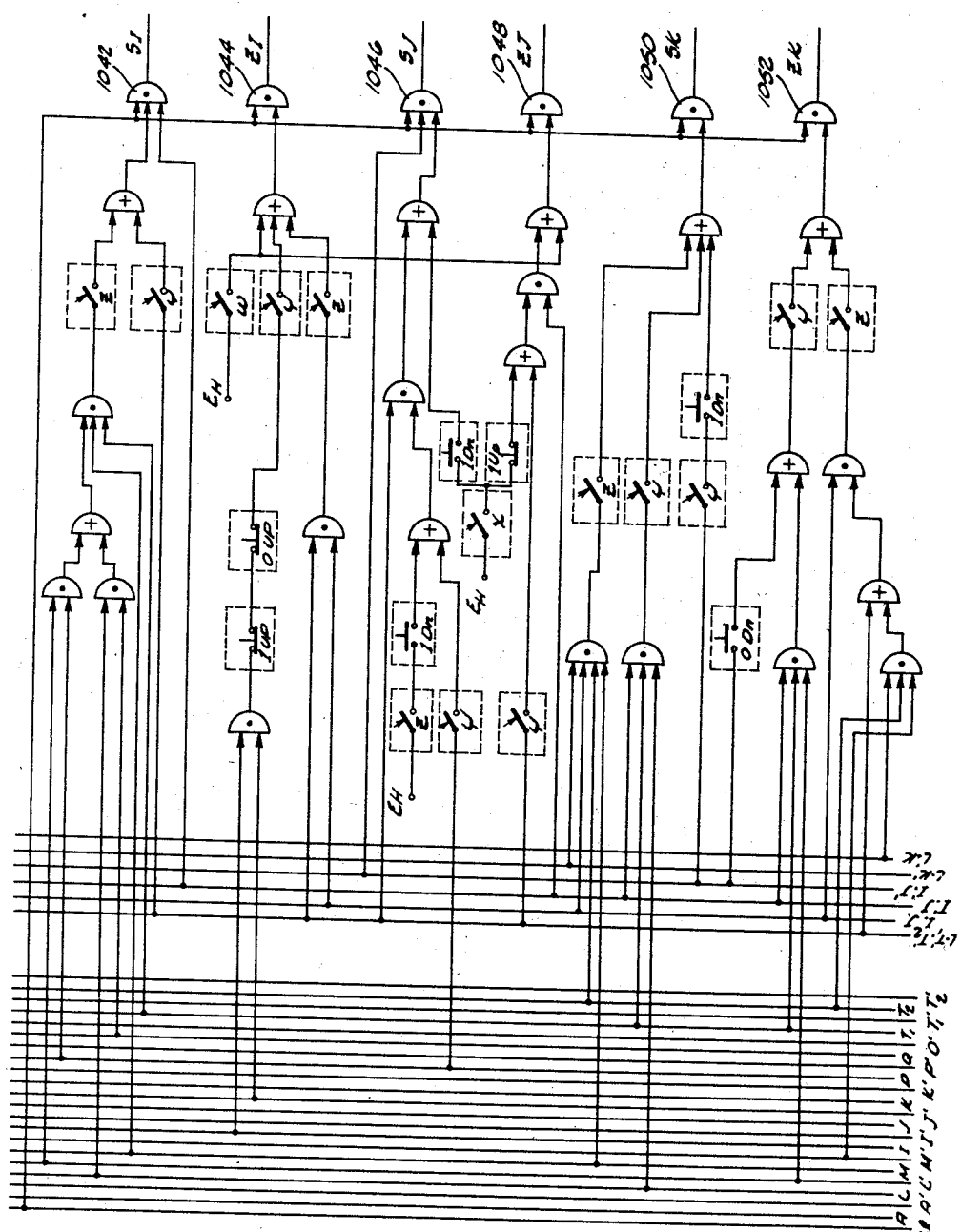
Figure 10C:
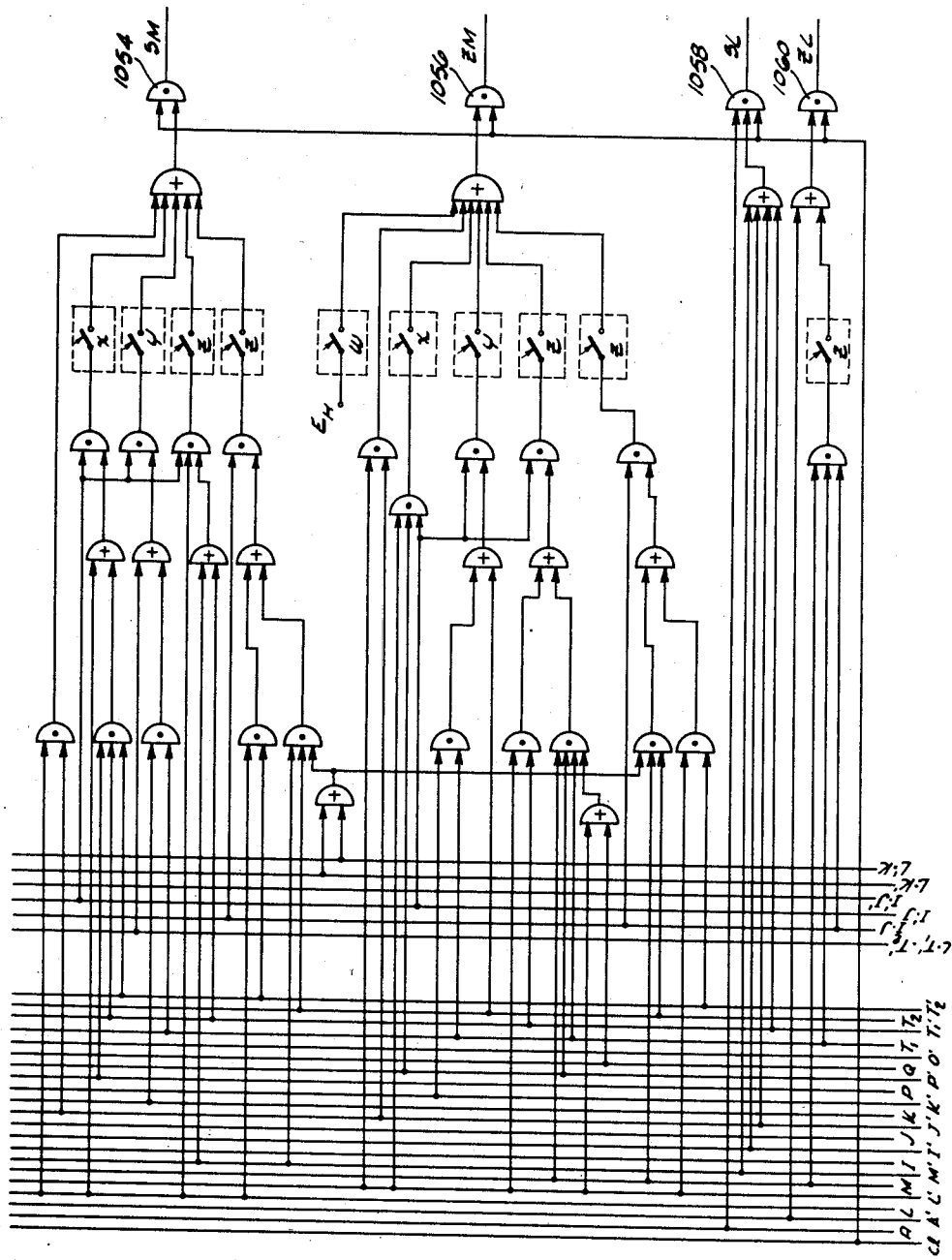

With reference now to Figs. 10A, 10B and 10C, which are interrelated as illustrated by Fig. 10, there is shown one form of detailed electrical circuit which is mechanized in accordance with the foregoing simplified composite equations and which corresponds structurally to diode gating matrix 83 and switch panel 84 in Fig. 6. In order to most clearly set forth the mechanization of the equations, each logical "and" gate is represented by a semicircular hood with a dot (.) in the center thereof, while each logical "or" gate is represented by a semicircular hood with a plus sign (+) in its center.

The "and" and "or" gates may utilize either vacuum tubes or crystal rectifiers, and are preferably similar structurally to the gating circuits illustrated in the article entitled "How an Electronic Brain Works" by Berkeley and Jensen, found on page 45 of the September 1951 issue of Radio-Electronics magazine. Briefly stated, each "and" gate includes two or more input terminals and a single output terminal and is responsive to the voltage levels of two-level signals applied to its input terminals for producing a high level voltage output signal at its output terminal only when all of the input signals are at their high level values. Each "or" gate, on the other hand, includes two or more input terminals and a single output terminal and is responsive to the voltage levels of two-level signals applied to its input terminals for producing a high-level output signal at its output terminal whenever one or more of the input signals is at its high level value.

With reference once more to the drawings, the mechanization of the input functions of flip-flops $T_1$, $T_2$, O, P and Q is shown in Fig. 10A, while Figs. 10B and 10C illustrate the mechanization of the input functions to flip-flops I, J and K, and flip-flops M and L, respectively. It should be pointed out, however, that several of the "and" gates shown in Fig. 10A are also common to Figs. 10B and 10C, the reason being that the specific terms mechanized by these gates appear in several flip-flop input functions. For example, "and" gate 1000 in Fig. 10A generates a signal corresponding to the term $(L.T_1'.T_2')$, this signal being utilized in the mechanization of the set-to-one function of flip-flops I, J, M and O, and of the set-to-zero function of flip-flops I, J, K and O. The other gates which are common to the mechanization of several input functions are "and" gates 1002, 1004, 1006, 1008 and 1010 in Fig. 10A, these gates generating signals corresponding to the algebraic terms $(I.J)$, $(I'.J)$, $(I'.J')$, $(L.K')$ and $(L'.K)$, respectively.

For purposes of clarity operation switch 92 is not shown as an integral gang switch as it actually exists, but is instead shown schematically as a plurality of individually located single-pole single-throw switches, each switch being designated either W, X, Y or Z indicative of the operation switch position in which its contacts are closed. In a similar manner the contact pileups of the 1 and 0 pushbuttons are shown as a plurality of individual push button contacts designated either 1 up, 0 up, 1 down or 0 down, these designations indicating the pushbutton with which the contacts are associated and the pushbutton position in which the contacts are closed.

In order to most clearly disclose the logical gating circuits of Figs. 10A, 10B and 10C, the mechanization of several of the composite equations will now be described in detail. With reference once more to Fig. 10A, Equation 6, which represents the set-to-one function of timing flip-flop $T_1$, is mechanized by a single "and" gate 1012, this gate having three input terminals for receiving the clock signal $(c1)$ and signals $(T_1')$ and $(T_2')$. In operation the clock pulse signal is passed to the output conductor of the gate whenever signals $(T_1')$ and $(T_2')$ are at their high level values, this output conductor being designated $ST_1$ and being coupled to the 1-setting grid of flip-flop $T_1$.

The 0-setting function to flip-flop $T_1$, which is represented by Equation 7, is mechanized by a two terminal "and" gate 1014, a two terminal "or" gate 1016, and a pair of W switches 92-1 and 92-3 which are closed only during the W or clear operation. As shown in Fig. 10A, one terminal of switch 92-1 is connected to a terminal $E_H$ of a source of relatively high potential, not shown, the other switch terminal being connected to the $P_0$ conductor which is in turn connected to the P-bar in the multiplexer unit. Switch 92-3, on the other hand, has one terminal connected to the S segment in the multiplexer unit over the $S_0$ conductor, the other switch terminal being connected to one input terminal of "or" gate 1016. The other input terminal of the "or" gate is connected to the $(T_1)$ signal bus while the "or" gate's output terminal is connected to one input terminal of "and" gate 1014, the other input terminal of gate 1014 being connected to the clock pulse signal bus $(c1)$.

In operation a signal corresponding to the term $(W.S_{seg})$ of Equation 7 is generated by switches 92-1 and 92-3 in conjunction with the P-bar and S-segment of the multiplexer unit. "Or" gate 1016 then functions to combine this signal with signal $T_1$ to produce a signal corresponding to the function $(W.S_{seg})+T_1$ of Equation 7, while "and" gate 1014 functions to combine the "or" gate output signal with the clock pulse signal to generate an output signal $ZT_1$ representative of Equation 7.

In a similar manner, Equation 8 is mechanized by a single "and" gate 1018 while Equation 9 is mechanized by an "and" gate 1020, an "or" gate 1022, and switches 92-1 and 92-3. It is clear, of course, that these switches may be employed in the mechanization of both Equations 7 and 9, since each of these equations includes the identical term $(W.S_{seg})$.

Continuing through the circuit of Fig. 10A, the set-to-zero function of flip-flop O is mechanized by a three terminal "and" gate 1024 and by common "and" gate 1000, gate 1024 functioning to combine the signal $(L.T_1'.T_2')$ from gate 1000 with the signals $(K')$ and $(c1)$ to produce an output signal corresponding to Equation 56. The set-to-one function of flip-flop O, on the other hand, is mechanized by a two terminal "and" gate 1026, a three terminal "and" gate 1028, common "and" gates 1000 and 1002, and a Z-switch designated 92-31. The logical significance of this gating circuit is that an output signal is produced on conductor $S_0$ only when a clock signal $(c1)$ is applied to gate 1026, "and" the operation is count (the Z switch is closed), "and" signal $(K)$ and the output signals from gates 1000 and 1002 are at their high level values. It will be recognized that combining these terms produces a logical equation identical with Equation 34, which is of course the set-to-one function of flip-flop O.

It will be noted that the gating circuit for the $S_0$ function also includes a resistor 1029 which is connected at one end to switch 92-31 and at its other end to a terminal $E_L$ of a source of relatively low potential, not shown. The purpose of this resistor is to maintain the output conductor from switch 92-31 at a low level voltage whenever the switch is open in order to maintain "and" gate 1026 as a two input terminal "and" gate. In other words, if resistor 1029 were omitted gate 1026 would act as a one input terminal "and" gate whenever switch 92-31 was opened, and consequently the clock signal $(c1)$ would be passed by gate 1026 during each and every digit time interval. It will be recognized that a similar resistor is employed with each "and" gate input terminal which is connected to a switch.

Returning again to the circuit of Fig. 10A, the function $S_P$ is mechanized in accordance with Equation 72 and includes a two-input terminal "and" gate 1030, a three input terminal "or" gate 1032, a 0-down switch 1034, a 1-down switch 1036, a pair of X switches 92-11 and 92-12, a pair of Y switches 92-21 and 92-22, the fill switch 94, and a Z switch 92-32, the interconnections between these elements being as shown in the drawings. The logical significance of this gating circuit is that the applied clock signal $(c1)$ is passed to conductor only when the output signal from "or" gate 1032 is at its high level value; this condition, in turn, may be caused by satisfaction of any one of three sets of conditions. Firstly, "or" gate 1032 will produce a high level output signal when the operation is mark (X switch 92-11 and 92-12 closed), and the $R_0$ lead is connected to $P_0$ lead in the multiplex unit, and common gate 1004 is producing a high level output signal. The function thus mechanized is the term $(X.I'.J.R_{seg})$ in Equation 72.

Secondly, gate 1032 also produces a high level output signal when the the operation is fill (Y switches 92-21 and 92-22 are closed), and a particular P segment, determined by the setting of fill switch 94, is connected to the P-bar in the multiplexer unit, and either the 0 or 1 pushbutton is depressed, and common gate 1006 is producing a high level output signal. The term of Equation 72 thus mechanized is $[Y.I'.J'.P_{seg}(1dn+0dn)]$. In a similar manner, "or" gate 1032 also produces a high level output signal when the operation is count (Z switch 92-32 closed), and a signal is applied to the P-bar in the multiplexer unit from one of the input instruments, this operation being represented by the term $(Z.P_{seg})$ in Equation 72.

The set-to-zero function of flip-flop P is mechanized by a single three input terminal "and" gate 1038, the output signal from this gate corresponding to the identical Equations 15 and 39; consequently, the output signal from gate 1038 is also utilized as the set-to-zero signal for flip-flop Q. The set-to-one function of flip-flop Q, on the other hand, is mechanized in accordance with Equation 36 by an "and" gate 1040 and the Q-bar of the multiplexer unit.

The remainder of the flip-flop input functions generated by the gating circuits of Figs. 10B and 10C are mechanized in a manner similar to the mechanization of the input functions described hereinabove. For purposes of simplification, therefore, each of the remaining input functions will be described by designating only the final "and" gate which combines the clock signal ($c_1$) with the signals generated by the remainder of the associated gate circuits. With reference now to Fig. 10B, the final gate circuits for functions $S_I$ and $Z_I$, which are mechanized in accordance with Equations 68 and 69, respectively, are gates 1042 and 1044, while gates 1046 and 1048 designate the final gate circuits for functions $S_J$ and $Z_J$, respectively, which are mechanized in accordance with Equations 65 and 66, respectively. In a similar manner, the final gates for the input functions to flip-flop K are "and" gates 1050 and 1052, these two gates merely serving to combine the clock signal ($c_1$) with signals corresponding to the remainder of the terms in Equations 69 and 71, respectively.

Referring now to Fig. 10C, the final "and" gates designated 1054, 1056, 1058 and 1060 are utilized in the mechanization of Equations 59, 60, 51, and 52, respectively, corresponding to the input functions for generating the input signals to flip-flops M and L. The details of each of the gating circuits and the function which it mechanizes may be checked by merely starting at the last "and" gate and proceeding backwards, all "and" gate input terms and switches in series therewith being combined with logical dots indicative of an "and" function, while all "or" gate input terms are combined with logical phases indicative of an "or" function.

It will be recognized by those skilled in the art that the composite equations set forth hereinabove may be transformed and even further simplified by utilizing well known rules of Boolean algebra. In addition, it will be recognized that the gating matrix shown in Figs. 10A, 10B and 10C may be mechanized in forms which differ from the form shown in the drawings. Accordingly, it is to be expressly understood that the composite equations are only one form of generalized equations, and that the logical gating matrix disclosed is merely typical of the general form of the gating matrix. It is also to be understood that the invention is to be limited only by the spirit and scope of the appended claims.

What is claimed as new is:

1. In a control system wherein a plurality of input signal sets from a corresponding plurality of instruments, having first and second conditions of operation, are periodically sampled in a predetermined sequence, each input signal set including a first two-level signal indicative of the first condition of operation and a second two-level signal indicative of the second condition of operation, a common control network responsive to each signal set for performing a control function each time the condition of the instrument changes, said common control network comprising: a first bistable storage element; means for sequentially applying the first signals from each of said signal sets to said first storage element during a first time interval whereby the output signal from said first storage element sequentially indicates whether or not the instruments are in the first condition; a second bistable storage element; means for sequentially applying the second signals of said signal sets to said second storage element during a second time interval whereby the output signal from said second storage element sequentially indicates whether or not the instruments are in the second condition of operation; cyclically operable memory means including first means for recording signals at a first position, second means for reading at a second position after a predetermined delay the signals recorded at the first position and third means normally operable to rerecord at said first position signals read at said second position, said third means being responsive to the application of a control signal for recording at said first position a signal indicative of the condition of the instrument whose input signal set is stored at the instant in said bistable storage elements; a gating circuit coupled to said first and second bistable storage elements and to said reading means, said gating circuit generating an actuating signal each time the condition of the instrument, as indicated by the output signals from said first and second storage elements, is different from the condition indicated by the signal received from the recording means; and means for applying a control signal to said third means each time an actuating signal is produced.

2. The common control network defined in claim 1 wherein said first predetermined time interval and said second time interval are equal, and wherein said predetermined time delay after which said second means reads the signals recorded by said first means is equal to said first and second time intervals.

3. In a control system wherein a plurality of input signal sets from a corresponding plurality of instruments are periodically sampled in a predetermined sequence to provide an input signal train, each instrument having first and second conditions of operation, the instantaneous condition of each instrument being represented by the associated input signal set, a common control network responsive to each signal set for performing a control function each time the condition of the associated instrument changes, said common control network comprising: first and second bistable storage elements for receiving the input signal train, said storage elements being responsive to the input signal train for producing a pair of output signals sequentially and cyclically representative of the condition of the input instruments; cyclically operable memory means including first means for recording signals at a first position, second means for reading at a second position after a predetermined delay the signals recorded at said first position, said predetermined delay being substantially equal to the period of one sampling cycle as represented by the output signals from said storage elements, and third means normally operable to rerecord at said first position signals read at said second position, said third means being operable in response to a control signal for recording at said first position a signal indicative of the condition of the instrument whose input signal set is stored at the instant in said bistable storage elements; a gating circuit coupled to said first and second bistable storage elements and to said second means, said gating circuit being responsive to the signals received from said storage elements and said second means for generating an operation signal each time the condition of an instrument changes from its previous condition; and means for applying a control signal to said third means each time an operation signal is produced.

4. The control system defined in claim 3 wherein said cyclically operable memory means includes a rotatable magnetic drum and means for rotating said drum at a predetermined speed, and wherein said first means includes a writing head positioned adjacent the periphery of said drum and said second means includes a reading head positioned adjacent the periphery of said drum, said reading head being circumferentially aligned with said writing head but displaced about the circumference of said drum in the direction of rotation by an angle substantially equal to $$\frac{T}{R} \times 360°$$

where R is the rotational speed of said drum in seconds; and T is the time interval between successive representations of the condition of any one instrument by the output signal from said bistable elements.

5. In a control system wherein a plurality of input signal sets from a corresponding plurality of instruments are periodically sampled in a predetermined sequence to provide an input signal train, each instrument having first and second conditions of operation, the instantaneous condition of each instrument being represented by the associated input signal set, a common control network responsive to each signal set for performing a control function each time the condition of the associated instrument changes, said common control network comprising: first and second bistable storage elements for receiving the input signal train, said storage elements being responsive to the input signal train for producing a pair of output signals sequentially and cyclically representative of the condition of the input instruments; cyclically operable memory means including first means actuatable for recording signals at a first position, second means for reading at a second position after a predetermined delay the signal recorded at said first position, said predetermined delay being substantially equal to the period of one sampling cycle as represented by the output signals from said storage elements, and third means normally operable to actuate said first means to rerecord at said first position signals read at said second position, said third means being operable in response to a control signal for actuating said first means to record at said first position a signal indicative of the condition of the instrument whose input signal set is stored at the instant in said bistable storage elements; a gating network coupled to said first and second bistable storage elements and to said second means, said gating network being responsive to the signals received from said storage elements and said second means for generating a control signal each time the condition of an instrument changes from its previous condition; and means for applying the control signal to said third means.

6. In a control system wherein a simultaneously presented pair of output signals received respectively from a pair of bistable storage elements periodically represent the condition of an instrument which has two conditions of operation, a control network for performing a control function each time the condition of the instrument has changed, said control network comprising: cyclically operable memory means including first means actuatable for recording signals at a first position, second means for reading at a second position after a predetermined delay the signals recorded at said first position, said predetermined delay being substantially equal to the interval between successive representations of the condition of the instrument by the output signals from the bistable storage elements, and third means normally operable to actuate said first means to rerecord at said first position signals read at said second position, said third means being operable in response to a control signal for actuating said first means to record at said first position a signal indicative of the condition of the instrument; a gating network coupled to the bistable storage elements and to said second means, said gating network being simultaneously responsive to the pair of signals received from the storage elements and the signals read by said second means for generating a control signal each time the condition of the instrument changes from its previous condition; and means for applying the control signal to said third means.

7. In an electronic control system utilizing a signal computation mechanism for controlling the operation of a plurality of instruments, each of said instruments including an output channel for generating a coded electrical information signal representing the condition of the instrument and an input channel for receiving a coded electrical control signal for varying the condition of the instrument, said computation mechanism including an input channel for receiving each coded information signal and an output channel for presenting a coded control signal representing a function of the received information signal, a multiplexing system for sequentially applying the information signals to the computation mechanism and for sequentially applying the control signal generated by the computation mechanism to the instruments, said multiplexing system comprising: a plurality of pairs of information channels corresponding to the plurality of instruments, respectively, each of said pairs of information channels including an input channel for receiving the coded information signal from the associated instrument and an output channel for applying the corresponding coded control signal to the associated instrument; a pair of computation channels including an output channel for applying the information signals to the input channel of the computation mechanism and an input channel for receiving the control signal from the computation mechanism; means for applying the signals appearing upon the input information channels to said output computation channel in a first predetermined sequence; and means for applying the control signals appearing on said input computation channel to said output information channels in a second predetermined sequence delayed with respect to said first predetermined sequence to apply to each instrument the control signal resulting from operation by the computation mechanism on the associated information signal.

8. In an electronic control system for controlling the condition of a plurality of instruments each of which includes an output channel for presenting a coded electrical information signal representative of the condition of the associated instrument and an input channel for receiving a coded electrical control signal for varying the condition of the instrument, and which includes a common control network having an input channel for serially receiving coded information signals and means responsive to the coded information signals for serially presenting at an associated output channel coded control signals, each control signal being delayed with respect to its corresponding information signal, a multiplexer unit for selectively interconnecting the input and output channels of the instruments with the output and input channels, respectively, of the common control network, said multiplexer unit comprising: a corresponding plurality of pairs of instrument channels respectively connected to said instruments, one channel of each pair being connected to the output channel of the associated instrument, the other channel of each pair being connected to the input channel of the associated instrument; a pair of common channels connected to the control network, one channel of said pair of common channels being connected to the input channel of the control network, the other channel of said pair of common channels being connected to the output channel of the control network; first cyclically operable means actuable to interconnect said one channel of each of said pairs of instrument channels to said one channel of said pair of common channels in a predetermined sequence whereby the information signals presented by the instruments are sequentially applied to the common control network; second cyclically operable means actuable to interconnect said other channel of said pair of common channels to said other channel of each of said pairs of instrument channels in said predetermined sequence, the phase of said second means being delayed with respect to the phase of said first means a time interval at least as large as the delay of the common control network in producing the coded control signal whereby each coded control signal is distributed to the instrument in response to whose coded information signal the control signal was produced.

9. In an electronic control system which employs a common control network for controlling the condition of a plurality of instruments each of which includes an output channel for presenting a coded electrical information signal representative of the condition of the associated instrument and an input channel for receiving a coded electrical control signal for varying the condition of the instrument, said common control network including an input channel for serially receiving a corresponding plurality of coded information signals and means responsive to the coded information signals for serially presenting at an associated output channel a corresponding plurity of delayed control signals, a multiplexer unit for selectively interconnecting the input and output channels of the instruments with the output and input channels, respectively, of the common control network, said multiplexer unit comprising: first cyclically operable means actuable to interconnect the output channels from the instruments to the input channel of the common control network in a predetermined sequence whereby the information signals presented by the instruments are sequentially applied to the common control network; second cyclically operable means actuable to interconnect the output channel from the common control network to the input channels of the instruments in said predetermined sequence, the phase of said second means being delayed with respect to the phase of said first means by a predetermined phase angle whereby each delayed control signal is distributed to the instrument in response to whose coded information signal the control signal was produced, and means for actuating said first and second cyclically operable means.

10. The multiplex unit defined in claim 9 wherein said second cyclically operable means includes a conductive member connected to the output channel of the common control network; a plurality of commutator segments, corresponding respectively to the input instruments, positioned adjacent said conductive member in said predetermined sequence, said commutator segments being respectively connected to the input channels of the instruments, and means for sequentially coupling said conductive member electrically to said commutator segments.

11. The multiplexer unit defined in claim 9 in which each instrument output channel includes a $p$ conductor and a $q$ conductor and each coded information signal includes a $p$ signal and a $q$ signal presented on the $p$ and $q$ conductors, respectively, and the input channel to the common control network includes a P channel and a Q channel, said first cyclically operable means including two spaced conjugate semicircular segments respectively connected to the P channel and Q channel; a plurality of $p$-segments corresponding in number to the number of instruments and respectively connected to the $p$ conductors of the instruments, said $p$-segments being sequentially positioned adjacent the semicircular segment connected to the P channel; a plurality of $q$-segments corresponding in number to the number of instruments and respectively connected to the $q$ conductors of the instruments, said $q$-segments being sequentially positioned adjacent the other semicircular segment; and means for first sequentially intercoupling said $p$-segments to said one semicircular segment, and then sequentially intercoupling said $q$-segments to said other semicircular segment.

12. The multiplexer unit defined in claim 11 wherein said $p$-segments are positioned adjacent said one semicircular segment in the same sequence in which said $q$-segments are positioned adjacent said other semicircular segment.

13. An electronic digital counter operable in conjunction with a plurality of input instruments for accumulating a corresponding plurality of counts, each count representing the number of times a coded electrical information signal from the associated input instrument has indicated the occurrence of a physical phenomenon being counted or measured by the instrument, each coded electrical information signal comprising at least two simultaneously presented bivalued signals, said counter comprising: a multiplexer unit connected to the input instruments for receiving the information signals from the instruments, said multiplexer unit being cyclically operable to sample the coded information signals in a predetermined sequence to produce a coded information signal train; said multiplexer unit sampling each of the bivalued signals of each coded information signal, a memory unit cyclically operable in synchronism with said multiplexer unit for storing the accumulated counts, said memory unit including first means for receiving and recording at a first position in said predetermined sequence accumulated count signals respectively representative of the accumulated counts of the input instruments, and second means for reading at a second position after a predetermined time delay the accumulated count signals recorded at said first position, said predetermined time delay being equal to the interval between successive samplings of each instrument by said multiplexer unit whereby the accumulated count signals are read at said second position in synchronism with the sampling of the information signals from the input instruments; and a counter control network coupled to said multiplexer unit for receiving the coded information signal train and to said first and second means within said memory unit, said counter control network being normally operable to apply to said first means the accumulated count signals received from said second means, said counter control network being operable in response to each of the bivalued signals of each sampled information signal which indicates an occurrence of the phenomenon being counted or measured to apply to said first means a new accumulated count signal representing an incremental change in the number represented by the associated accumulated count signal received from said second means.

14. An electronic digital counter operable in conjunction with a plurality of input instruments for accumulating a corresponding plurality of counts, each count representing the number of times a coded electrical information signal from the associated input instrument has indicated the occurrence of a physical phenomenon being counted or measured by the instrument, said counter comprising: a multiplexer unit connected to the input instruments for receiving the information signals from the instruments, said multiplexer unit being cyclically operable to sample the coded information signals in a predetermined sequence to produce a coded information signal train; a memory unit cyclically operable in synchronism with said multiplexer unit for storing the accumulated counts, said memory unit including first means for receiving and recording at a first position in said predetermined sequence accumulated count signals respectively representative of the accumulated counts of the input instruments, and second means for reading at a second position after a predetermined time delay the accumulated count signals recorded at said first position, said predetermined time delay being equal to the interval between successive samplings of each instrument by said multiplexer unit; and a counter control network coupled to said multiplexer unit for receiving the coded information signal train and to said first and second means within said memory unit, said counter control network including third means normally operable to apply to said first means the accumulated count signals received from said second means; and fourth means for generating a control signal each time a sampled information signal indicates an occurrence of the phenomenon being counted or measured by the associated input instrument, said third means being operable in response to each control signal to apply to said first means a new accumulated count signal representing an incremental change in the accumulated count represented by the accumulated count signal simultaneously being received from said second means.

15. The electronic digital counter defined in claim 14 wherein each count is accumulated as a binary number, each accumulated count signal including a predetermined number of binary digit signals representative of the binary digits of the corresponding binary number, said counter control network including fifth means coupled to said third means for producing an output signal each time a control signal is generated and the magnitude of the binary number representing the new count has more than said predetermined number of binary digits.

16. The electronic digital counter defined in claim 15 wherein said multiplexer unit includes means cyclically operable in synchronism with said memory unit and connected to said fifth means and the input instruments for distributing each output signal produced by said fifth means to the input instrument in response to whose coded information signal said fourth means generated the control signal which was operative in producing the output signal.

17. An electronic digital counter, operative in conjunction with an instrument which produces a coded information signal indicative of each occurrence of a phenomenon being counted or measured by the instrument, for accumulating a count representative of the number of occurrences of the phenomenon, said counter comprising: a cyclically operable memory unit including first means actuatable for recording at a first position a composite electrical signal representative of first and second binary numbers, said first binary number representing the accumulated count and said second binary number representing a predetermined number of fixed magnitude, second means for reading at a second position after a predetermined time delay composite electrical signals recorded at said first position, and third means normally operable to actuate said first means to rerecord at said first position signals read at said second position whereby said composite electrical signal is normally recirculated in said memory unit; fourth means coupled to the instrument and responsive to its coded information signal for generating a control signal each time the phenomenon occurs; and fifth means coupled to said second means and to said fourth means, said fifth means being responsive to said control signal and said composite signal for combining the electrical signals representing said second binary number with the electrical signals representing said first binary number to produce a new composite electrical signal in which said first number has been incrementally changed by the magnitude of said second number, said third means being operable in response to each control signal generated for actuating said first means to record the new composite electrical signal produced by said fifth means.

18. The electronic digital counter defined in claim 17 wherein the number of digits in said first binary number is limited to a predetermined number by the capacity of said memory unit, said counter further including sixth means coupled to said fifth means for generating an output signal each time an incremental change in said first number produces a composite electrical signal which exceeds the caapcity of said memory unit.

19. The digital counter defined in claim 17 which also includes means coupled to said fifth means for producing an electrical output signal each time the accumulated count, as represented by said first number, reaches a predetermined magnitude.

20. An electronic digital counter operable to accumulate a count representative of the number of occurrences of a phenomenon being counted or measured by an associated instrument which generates a coded information signal which indicates each occurrence of the phenomenon, said counter comprising: sampling means for periodically sampling the coded information signal; a cyclically operable memory unit including first means actuatable for recording at a first position a composite electrical signal representative of first and second binary numbers, said first binary number representing the accumulated count and said second binary number representing a predetermined number of fixed magnitude, second means for reading at a second position after a predetermined time delay composite electrical signals recorded at said first position, said predetermined time delay being equal to one sampling period of said sampling means, and third means normally operable to actuate said first means to rerecord at said first position signals read at said second position whereby said composite electrical signal is normally recirculated in said memory unit; fourth means coupled to the instrument and responsive to its coded information signal for generating a control signal each time the phenomenon occurs; and fifth means coupled to said second means and to said fourth means, said fifth means being responsive to said control signal and said composite signal for combining the electrical signals representing said second binary number with the electrical signals representing said first binary number to produce a new composite electrical signal in which said first number has been incrementally changed by the magnitude of said second number, said third means being operable in response to each control signal generated for actuating said first means to record the new composite electrical signal produced by said fifth means.

References Cited in the file of this patent

UNITED STATES PATENTS

| | | |
|---|---|---|
| 2,171,044 | Nelsen | Aug. 29, 1939 |
| 2,346,869 | Poole | Apr. 18, 1944 |
| 2,517,559 | Haigh et al. | Aug. 8, 1950 |
| 2,544,894 | Nelson | Mar. 13, 1951 |
| 2,557,729 | Eckert | June 19, 1951 |
| 2,576,026 | Meacham | Nov. 20, 1951 |
| 2,599,675 | Volz | June 10, 1952 |
| 2,622,193 | Clayden | Dec. 16, 1952 |
| 2,649,513 | Luhn | Aug. 18, 1953 |
| 2,764,634 | Brooks et al. | Sept. 25, 1956 |
| 2,787,416 | Hansen | Apr. 2, 1957 |
| 2,838,745 | Wright et al. | June 10, 1958 |

OTHER REFERENCES

"Design Features of a Magnetic Drum Information System," by J. L. Hill, dated March 1950, brochure published by Engineering Research Associates, Inc., St. Paul, Minnesota.

"Design Features of Remington Rand Speed Tally," by John L. Hill, April 1954, pages 155–162 of Trends in Computers: Automatic Control and Data Processing, publishing by the American Institute of Electrical Engineers, 33 West 39th Street, New York 18, N.Y.